United States Patent [19]

Kato et al.

[11] Patent Number: 5,680,251

[45] Date of Patent: Oct. 21, 1997

[54] LENS BARREL HAVING A VIBRATION COMPENSATION LENS UNIT WITH MOVEABLE LENS SUPPORT MEMBER

[75] Inventors: Minoru Kato; Yoshio Imura, both of Kawasaki; Hidenori Miyamoto, Urayasu; Junichi Omi, Kawasaki, all of Japan

[73] Assignee: Nikon Corporation, Tokyo, Japan

[21] Appl. No.: 376,346

[22] Filed: Jan. 23, 1995

[30] Foreign Application Priority Data

| Jan. 21, 1994 | [JP] | Japan | 6-005360 |
| Feb. 1, 1994 | [JP] | Japan | 6-027599 |
| Feb. 3, 1994 | [JP] | Japan | 6-030820 |

[51] Int. Cl.$^6$ .................... G02B 27/64; G03B 1/18
[52] U.S. Cl. .............. 359/557; 359/554; 396/55; 396/421
[58] Field of Search ................ 359/554–557, 359/614–706, 813, 823, 825–830; 354/70, 430, 400–408, 202; 396/52–55, 421, 428

[56] References Cited

U.S. PATENT DOCUMENTS

| 4,974,949 | 12/1990 | Tanaka | 359/694 |
| 5,091,802 | 2/1992 | Imaoka et al. | 359/694 |
| 5,172,276 | 12/1992 | Ueyama et al. | 359/554 |
| 5,210,644 | 5/1993 | Nomura | 359/694 |
| 5,349,475 | 9/1994 | Nomura et al. | 359/700 |
| 5,398,132 | 3/1995 | Otani | 359/557 |
| 5,416,558 | 5/1995 | Katayama et al. | 354/430 |
| 5,526,192 | 6/1996 | Imura et al. | 359/554 |
| 5,581,317 | 12/1996 | Kitagawa et al. | 396/55 |
| 5,606,384 | 2/1997 | Yamazaki et al. | 359/557 |

*Primary Examiner*—Thong Nguyen

[57] ABSTRACT

A zoom lens barrel containing a support member for supporting a vibration compensation lens and a vibration compensation drive unit thereof. The support member is held inside the lens barrel so that it is moveable in the direction of the optical axis. The support member is formed from a mold, with the molded support member including multiple gear shafts and cam followers. The multiple gear shafts are positioned on the molded support member in a row and in a direction which is perpendicular to the optical axis. The cam followers are positioned on the support member in a direction perpendicular to the optical axis. The multiple shafts are positioned on the support member at different angles from the cam followers so that the respective die extraction angles are different. The multiple gear shafts support a gear train which is positioned near an interior surface of the lens barrel. A flexible printed circuit board inside the lens barrel extends from a control circuit positioned outside of the lens barrel to various electrical components inside the lens barrel. A support member is also provided having multiple arms that extend away from the support member and a cover plate for covering the vibration compensation lens drive unit.

4 Claims, 18 Drawing Sheets

LENS BARREL HAVING A VIBRATION COMPENSATION LENS UNIT WITH MOVEABLE LENS SUPPORT MEMBER

BACKGROUND OF THE INVENTION

1. Field of the Invention

The present invention relates to a lens barrel containing an optical unit base for supporting a vibration compensation lens and a vibration compensation drive unit, and, in particular, relates to improvements in (a) the molded structure of the optical unit base, (b) the positioning of the wiring on the optical unit base, and (c) the structural integrity of the optical unit base.

2. Description of the Related Art

Most zoom lens barrels produced today contain features that are either partially or completely automated. For example, significant advancements have been made in the areas of autoexposure ("AE") and autofocusing ("AF"). However, advancements in the area of automatic adjustments for camera vibration caused by hand tremors and the like have been less significant.

Conventional zoom lens barrels, having optical systems that compensate for vibration affecting the lens barrel, contain the following components: a vibration detection unit, a vibration compensation drive unit and an adjustable lens group. If the vibration detection unit senses a vibration then it directs the vibration compensation drive unit to shift the adjustable lens in a direction perpendicular to the optical axis. In this manner, the movement of the adjustable lens compensates for the vibrations affecting the optical system. Japanese patent publication Number 03-110530 teaches this type of optical system.

In conventional zoom lens barrels, the adjustable lens and gear shafts are positioned on a lens support plate. However, a drive motor is positioned outside the lens support plate. As a result, the size of the lens barrel becomes larger.

All zoom lens barrels contain lenses that move (i.e., advance and retreat) in the optical axis direction. This movement in the optical axis direction is made possible by fitting a lens base with cam pins. The cam pins extend through a straight hole in a fixed cylinder of the lens barrel and into spiral grooves in a cylinder positioned over the fixed cylinder. When the cam cylinder is rotated around the fixed cylinder, the cam pins and the lens base are forced to move in the optical axis direction. In this type of system, it is not important to strategically position the cam follower pins.

There have been several attempts to construct a vibration compensation optical system in which the motor was positioned inside the lens base. For example, the Japanese patent Application 04-32998 discloses a zoom lens barrel having an image blur prevention mechanism consisting of an electric motor, a gear train, a screw mechanism and an adjustable lens that are supported on an interior surface of a lens plate. Japanese patent Application 04-32998 teaches that the most effective method to accomplish this task is by forming the lens base having the cam follower pins from a mold. This reduces the manufacturing costs as well as the size of the lens barrel. Japanese patent Application 04-32998, however, does not teach how to solve the problem of extracting the lens support plate from the die. Lens support plates have very complex structures. As a result, molds often break when they are extracted from the die.

Lens barrels containing zoom lens optical systems typically have problems communicating a signal from a control circuit positioned outside of the lens barrel to the electrical components (for example, focusing motors and zoom motors) positioned on the moving lens support plate inside the lens barrel.

Conventional cameras solve this problem by using a printed circuit board to connect the control circuit to the moving electrical components within the lens barrel. Typically, the flexible printed circuit board is folded over several times so that when the optical system moves in the direction of the optical axis, the folded printed circuit board unfolds and becomes appropriately shaped so that it will not place an unmanageable load on structural units within the lens barrel.

Japanese Utility Model publication No. 4-10736 teaches a lens barrel having a flexible printed circuit board communicating a signal from a control circuit positioned outside the lens barrel to electrical components inside the barrel. Japanese publication No. 4-10736 discloses a lens barrel having a space for storing the folding flexible printed circuit board. The flexible printed board is pulled out from this space when the optical system extends and recoils into this space when the optical system retracts. The problem with this type of system is that the space for storing the flexible printed circuit board occupies a large amount of space within the barrel. As a result, the size of the lens barrel becomes larger. Japanese publication No. 4-10736 does not disclose structure for solving the problem of communicating a signal from a control circuit outside the lens barrel to a vibration compensation device positioned inside the lens barrel. Vibration compensation devices occupy nearly all of the space inside the lens barrel. As a result, there is not enough space between the interior surface of the lens barrel and the vibration compensation device for the flexible printed circuit board to extend through.

It is well known in the art that zoom lenses can be made shorter in the optical axis direction by varying the angles of the cam grooves on the cam cylinder. It is also known to position the follower pins on arms that extend away from the body of the support plate. These two modifications make the lens barrel shorter in the optical axis direction and ensure sufficient stroke between the lenses of the optical system. The problem with positioning the follower pins on arms that extend away from the body of the support plate is that when additional weight is applied to the support plate (i.e., gears and electrical motors), there is a danger that the support plate will tilt. If the support plate tilts, there will be a deterioration in the optical characteristics of the optical system.

SUMMARY OF THE INVENTION

Accordingly, it is an object of the present invention to provide a lens barrel with a molded lens support member having a cam follower positioned on the exterior surfaces thereof.

It is another object of the invention to provide a lens barrel with a molded lens support member having multiple gear shafts in close proximity to the optical axis of the lens system.

It is another object of the present invention to provide a lens barrel with a molded lens support member that is movable in the direction of the optical axis.

It is another object of the present invention to provide a lens barrel with a molded lens support member having multiple die extraction angles.

Additional objects and advantages of the invention will be set forth in the description which follows, and, in part, will be obvious from the description, or may be learned by practice of the invention.

Objects of the present invention are achieved by providing a lens barrel comprising an optical system having an optical axis, an optical unit base for carrying the optical system in the optical axis direction, the optical unit base having cam followers positioned on the external surface thereof, the cam followers extending in a direction perpendicular to the optical axis, multiple gear shafts for supporting a gear train, the multiple gear shafts being positioned in a row on the optical unit base in a direction parallel to a direction perpendicular to the optical axis whereby the multiple gear shafts of the gear train and the cam followers are attached at different angles on the optical base unit.

Objects of the present invention may also be achieved by providing a lens barrel comprising an adjustable optical system, a drive mechanism connected to the adjustable optical system, the drive mechanism including a motor and a reduction gear train, and a flexible printed circuit board connectable to the control circuit positioned outside the lens barrel and the drive mechanism, the flexible printed circuit board being positioned near the reduction gear train.

Objects of the present invention are further achieved by providing a lens barrel comprising an adjustable zoom lens optical system, a reduction gear train positioned between the adjustable zoom lens optical system and a motor, the motor transmitting a driving force to the adjustable zoom lens optical system via the reduction gear train, the reduction gear train being positioned near the interior surface of the barrel, and a flexible printed circuit board connecting the motor to a control circuit positioned outside the lens barrel, the flexible printed circuit board extending through a space between an interior surface of the lens barrel and the reduction gear train.

Objects of the present invention may also be achieved by providing a lens barrel comprising a support member for supporting an optical system having an optical axis, the support member having a carrier for carrying the optical system, a fixed cylinder for housing the support member and the optical system, a cam cylinder positioned over the fixed cylinder and adapted to rotate around the optical axis, multiple arms connected to the outer periphery of the support member and extending in the optical axis direction to points on an interior surface of the fixed barrel located past the optical system, follower pins connected to an exterior surface of each of the multiple arms, the follower pins extending through a groove in the fixed cylinder and into a groove in the cam cylinder and a cover positioned over the optical system and seated on ledges on each of the multiple arms.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
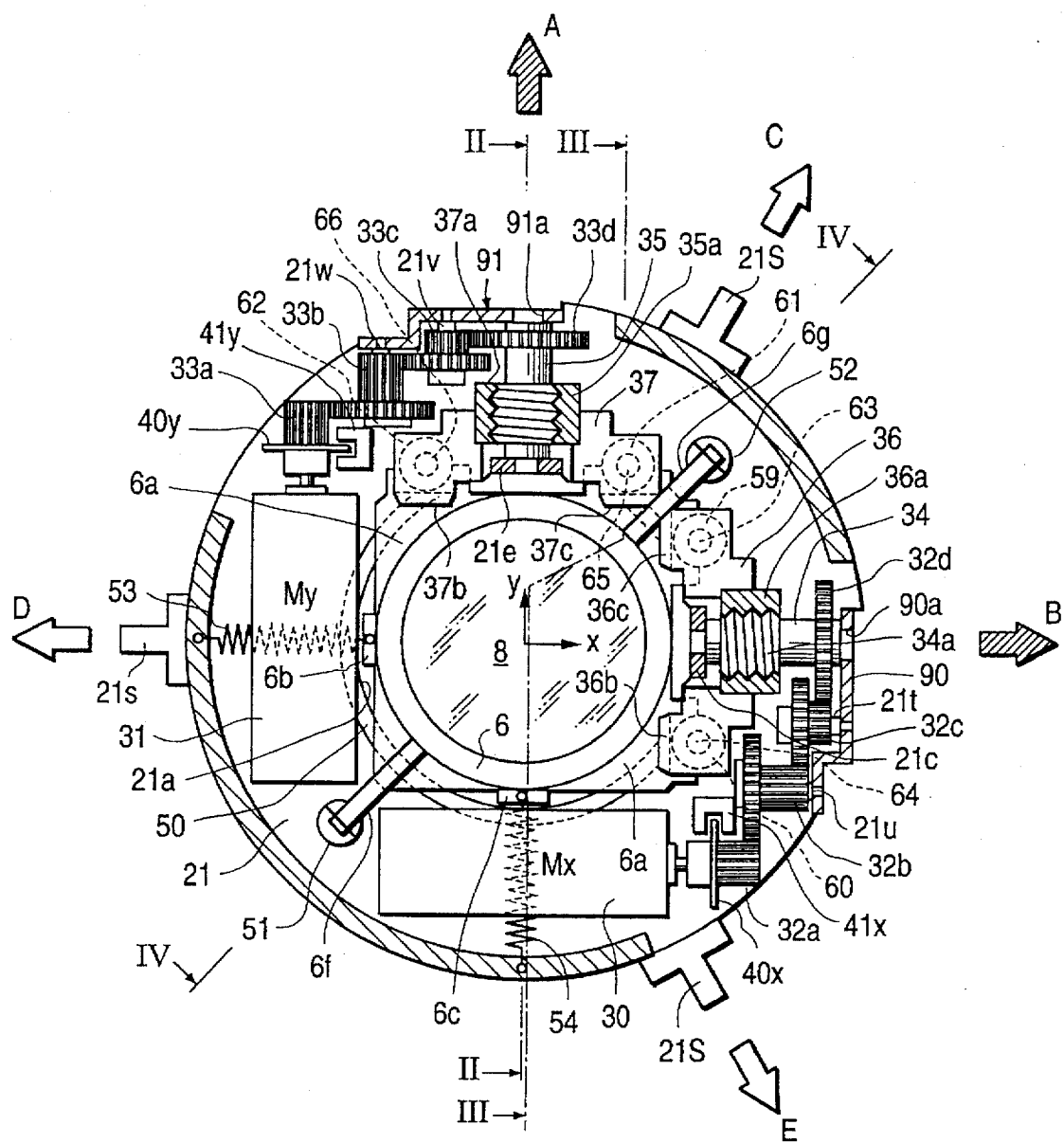
FIG. 1 is a cross-sectional diagram of a lens barrel containing a vibration compensation device in accordance with a first embodiment of the present invention.

Reference will now be made in detail to the present preferred embodiments of the present invention, examples of which are illustrated in the accompanying drawings, wherein like reference numerals refer to like elements throughout.

FIGS. 1 through 6 show a camera with a lens barrel containing a vibration compensation drive unit 20 positioned on a lens unit base 21 in accordance with a first preferred embodiment of the invention.

Figure 6:
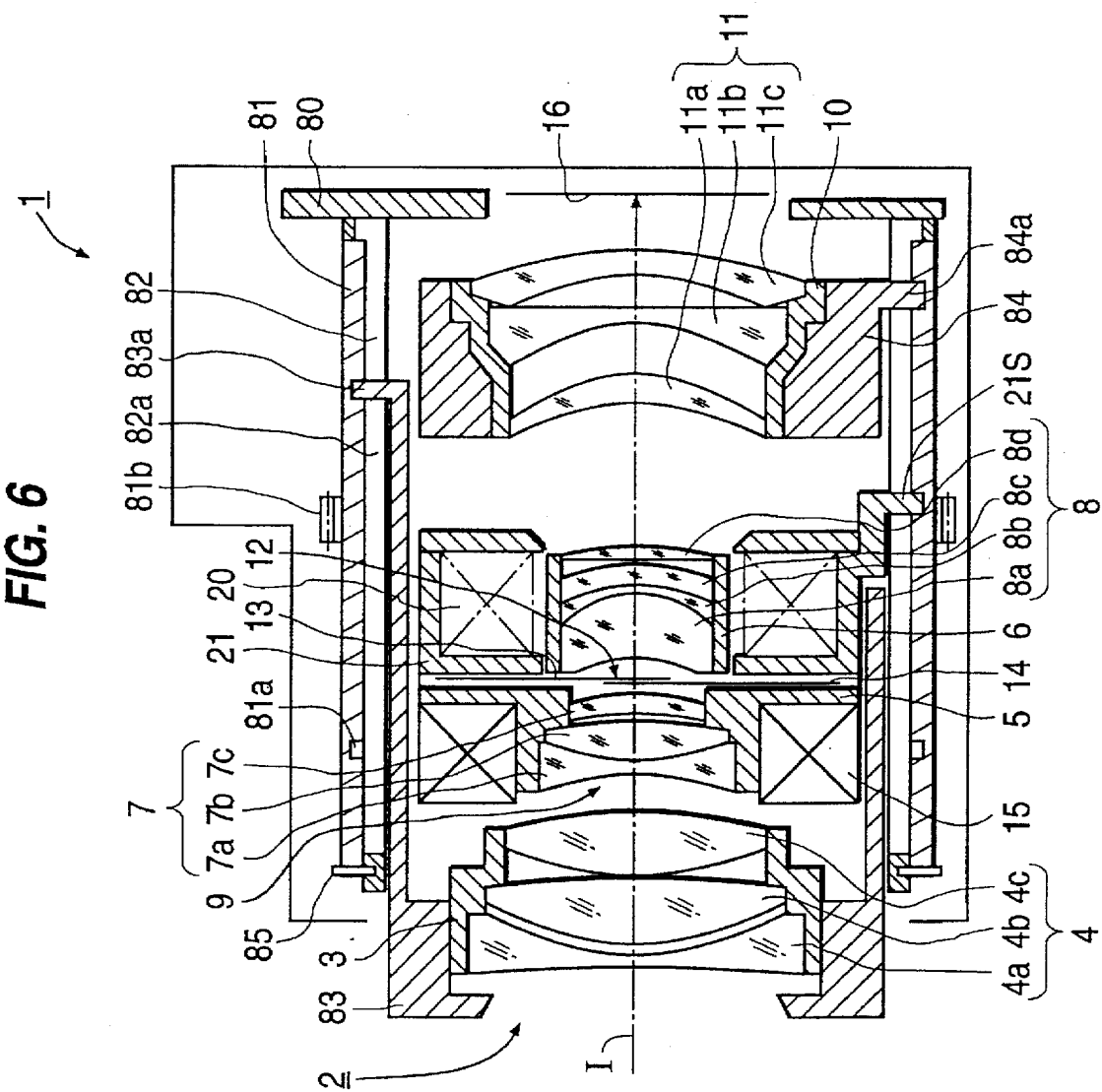
FIG. 6 is a schematic diagram showing a camera with a vibration compensation device according to a preferred embodiment of the present invention.

As seen in FIG. 6, camera 1 includes a main optical system 2 comprising a first lens group 4, a second lens group 9 and a third lens group 11. The first lens group 4 comprises three lenses, 4a, 4b and 4c held by a lens rim 3. The second lens group 9 includes a total of seven lenses: three in a front lens group 7, and four in a rear lens group 8. The front lens group 7 comprises three lenses 7a, 7b and 7c held by a lens rim 5. The rear lens group 8 comprises four lens 8a, 8b, 8c and 8d held by lens rim 6. The first lens group 4 and the second lens group 9 function as a zoom lens. The third lens group 11 functions as a focusing lens. The third lens group 11 comprises three lenses 11a, 11b and 11c held by lens rim 10.

A lens shutter 12 is positioned between the front lens group 7 and rear lens group 8, and comprises shutter blades 13 and 14. A shutter driver 15 for driving the shutter blades 13 and 14 is positioned at the outer circumference of the lens rim 5. An image-forming plane 16 is located opposite the rear end of the main optical system 2 and is the plane on which a image is formed. Optical axis I of the main optical system 2 is perpendicular to image-framing plane 16.

The lens rim 3 is connected to a first group lens cylinder 83. A cam pin 83a is positioned at one end of the first lens group cylinder 83. An optical unit base 21 supports a vibration compensation drive unit 20. Three cam pins 21s protrude radially from the exterior surface of optical unit base 21 and are spaced apart at equal intervals. The lens rim 10 is connected to a third group lens cylinder 84. A cam pin 84a is positioned at one end of the third lens group cylinder 84 and protrudes outwardly from it exterior surface. A lens barrel 82 is fixed to a camera body 80. A cam cylinder 81 is positioned over the outer circumference of the lens barrel 82 and is free to rotate around the lens barrel 82. A ring 85 is positioned at the front end of lens barrel 82 for preventing the cam cylinder 81 from slipping off the lens barrel 82. In addition, cam grooves 81a are positioned on the interior surface of cam cylinder 81 and straight guide grooves 82a are positioned on the lens barrel 82. The cam pins 21S, 83a, and 84a pass through the straight guide grooves 82a and extend into the cam grooves 81a. As a result, the rotation of cam cylinder 81 around lens barrel 82 causes the respective lens groups 4, 7, 8 and 11 to move in the direction of the optical axis I. A gear 81b attached to the exterior surface of cam cylinder 81 is provided to mesh with a drive gear not shown in the diagram. The main optical system 2 is configured so that the rear lens group 8 (hereinafter referred to as "the vibration compensation lens" 8) can be adjusted in a direction perpendicular to the optical axis (I) by the vibration compensation drive unit 20. The vibration compensation drive unit 20 is positioned in a space near the outer circumference of the vibration compensation lens 8.

A lens barrel with the vibration compensation drive unit 20 in accordance with the first embodiment of the present invention will now be described in detail with reference to FIGS. 1 through 4.

The vibration compensation lens 8 is held and secured inside lens rim 6 and lens rim 6 includes a flange 6a which contacts the optical unit base 21 through a sliding member 50. Two arms 6f, 6g are attached to and extend from the lens rim 6. The two arms 6f, 6g are connected to the optical unit base 21 by springs 51, 52. The vibration compensation lens 8 is thereby secured around an opening 21a in the base 21 by the sliding member 50 and springs 51 and 52. The sliding member 50 comprises materials with low-friction characteristics such as teflon, fluorocarbon resin, and phosphor bronze. Alternatively, the surface of sliding member 50 could be treated with a substance having a low friction characteristic. Because of the low-friction characteristics of the sliding member 50, the vibration compensation lens 8 is able to move in a low load in a direction which is perpendicular to the main optical axis I. Moreover, the vibration compensation drive unit 20 is energized by springs 51, 52 so that there is no toppling which would lead to deterioration in optical performance.

Figure 2:
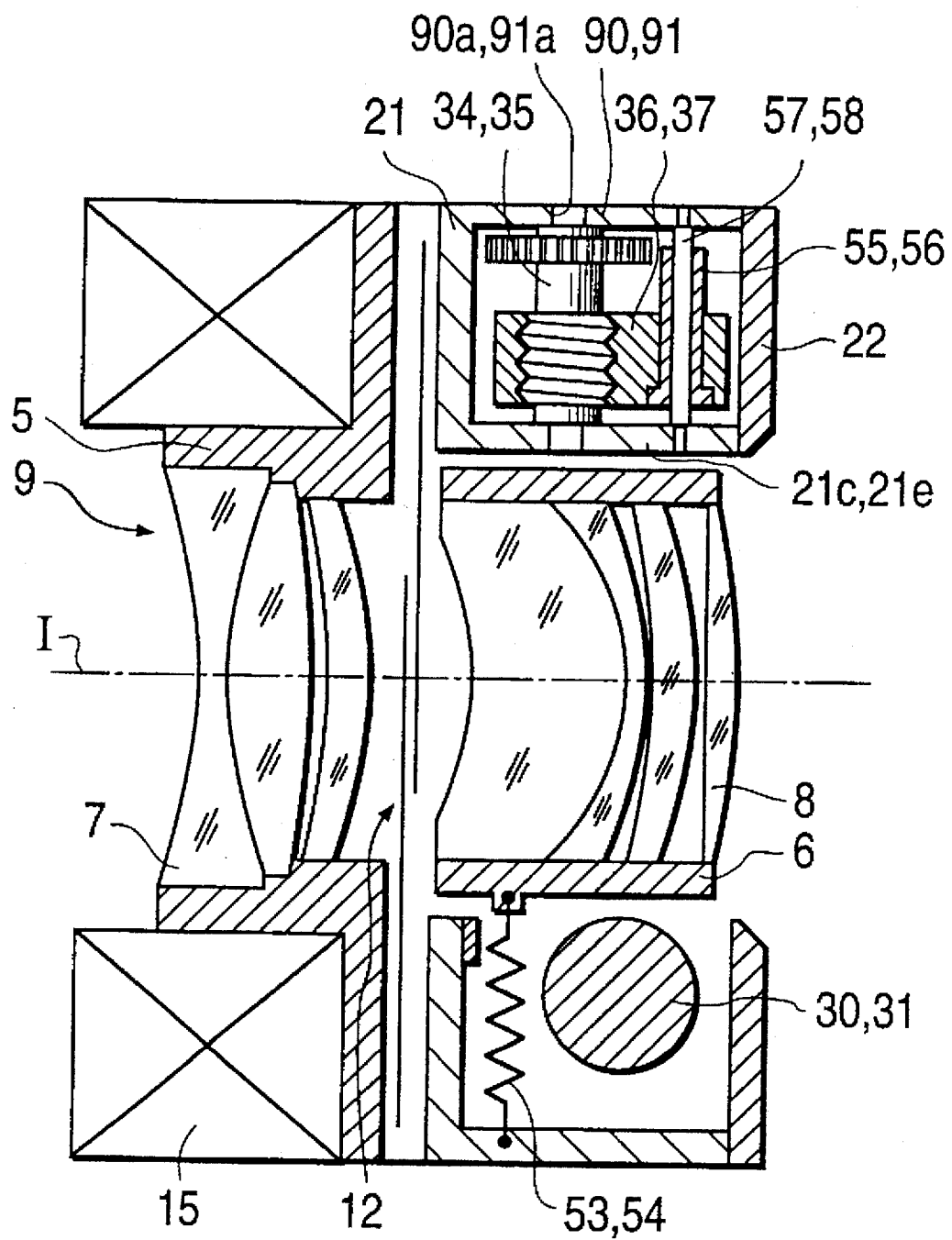
FIG. 2 is a cross-sectional diagram of the vibration compensation device of FIG. 1, taken along the II—II line in FIG. 1, in accordance with the first embodiment of the present invention.

Referring now to FIGS. 1 and 2, DC motors 30, 31 drive the vibration compensation lens for moving the vibration compensation lens is an x-axis direction and a y-axis direction respectively. In FIG. 1, DC motor 30 is also referenced as Mx and DC motor 31 is also referenced as My. Gear trains 32, 33 are rotation transmission gear trains which transmit the driving force of motors 30 and 31, respectively. Gear train 32 includes gears 32a, 32b, 32c, and 32d and transmits the driving force of motor 30 to a first shaft 34. Gear train 33 includes gears 33a, 33b, 33c and 34d and transmits the driving force of motor 31 to a second shaft 35. The first and second shafts 34, 35 extend in the x-axis direction and the y-axis direction respectively. The first and second shafts 34, 35 are supported at one of their ends by shaft receiving member 21c and 21e, respectively and supported at their other ends by shaft receiving sections 90a and 91a respectively. The shaft receiving members 21c, 21e are attached to optical unit base 21. The shaft receiving sections 90a and 91a are attached to stepped pressure plates 90 and 91, respectively. The stepped pressure plates 90 and 91 are secured to the optical unit base 21 by machine screws. Furthermore, the first and second shafts 34, 35 are supported so that they are able to rotate. The DC motors 30, 31 are secured to the optical unit base 21. The gears 32b, 32c are supported by and rotate around gear shafts 21u and 21t respectively. Likewise, the gears 33b, 33c are supported by and rotate around gear shafts 21w and 21v respectively. The gears 32b and 32c are prevented from slipping off their respective gear shafts 21u and 21t by the stepped pressure plate 90. The gears 33b and 32c are prevented from slipping off their respective gear shafts 21w and 21v by the stepped pressure plate 91. The gears 21t, 21u, 21v, and 21w are formed as a molded unit with the optical base unit 21. The gears 32d and 33d are attached to the shafts 34 and 35 respectively, so that they are able to rotate in unison therewith.

Referring now to FIGS. 1 and 2, wherein the shafts 34 and 35 are respectfully connected to an x-axis moving member 36 and a y-axis moving member 37. The x-axis moving member 36 includes a female screw 36a which is threaded into a male screw 34a of shaft 34 to attach the x-axis moving member 36. Similarly, the Y-axis moving member 37 includes a female screw 37a which is threaded into a male screw of 35a of shaft 35 to attach the shaft 35 to Y-axis moving member 37. Guide members 55 and 56 are respectively secured to the moving members 36 and 37. The guide members 55 and 56 are guided by guide shafts 57 and 58, respectively. The guide shaft 57 is positioned between and secured to shaft receiving member 21c and stepper pressure plate 90. The guide shaft 58 is positioned between and secured to shaft receiving member 21e and stepper pressure plate 91. The guide shafts 58 and 57 are parallel to shafts 34 and 35, respectively. The above describe structure reduces play which occurs in the threaded sections and ensures straight movement of the vibration compensation lens 8. The above describe structure also allows moving members 36 and 37 to be moved in the x-axis direction and the y-axis direction by motors 30 and 31, respectively.

Figure 3:
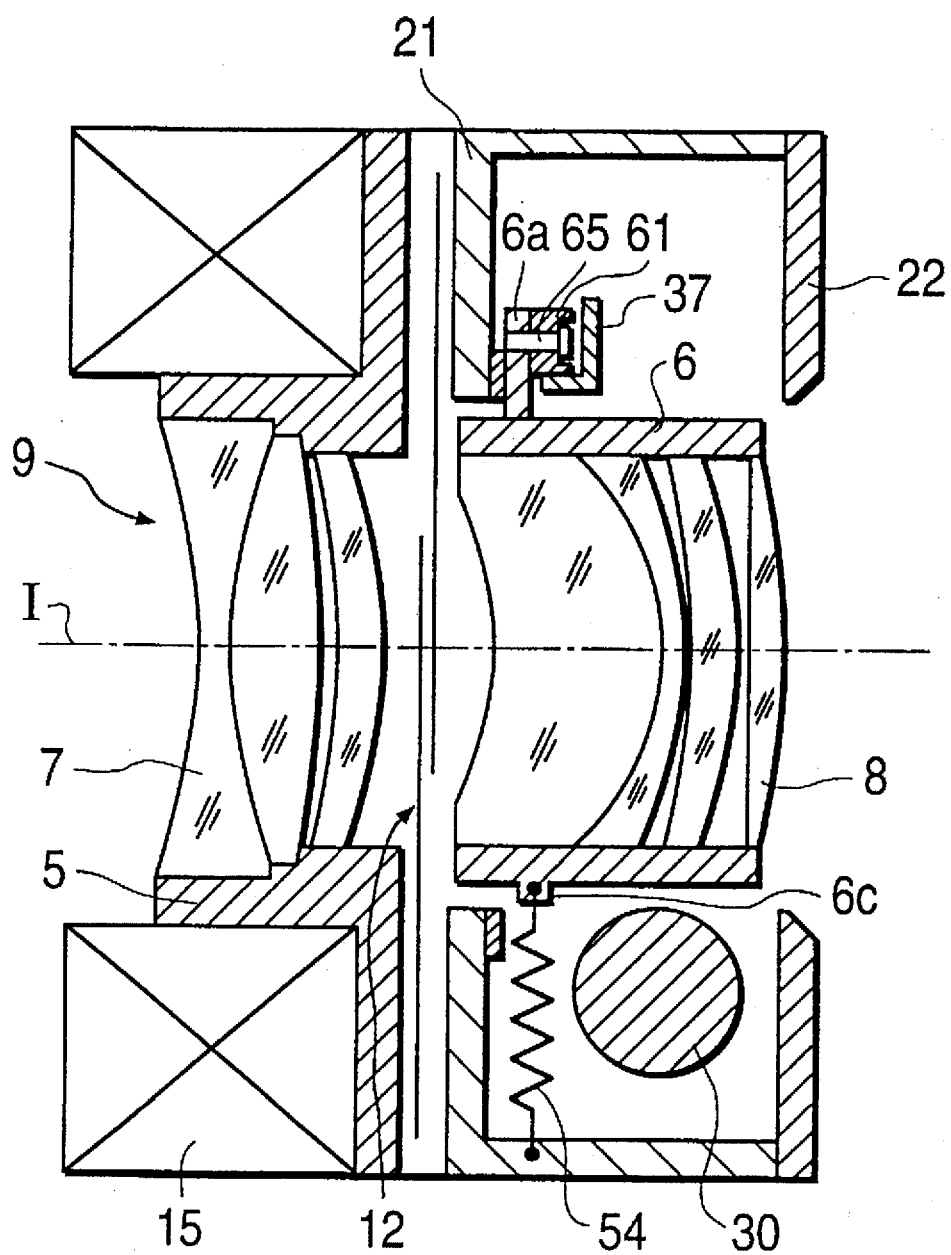
FIG. 3 is a cross-sectional diagram of the vibration compensation device of FIG. 1, taken along the III—III line in FIG. 1, in accordance with the first embodiment of the present invention.
Figure 4:
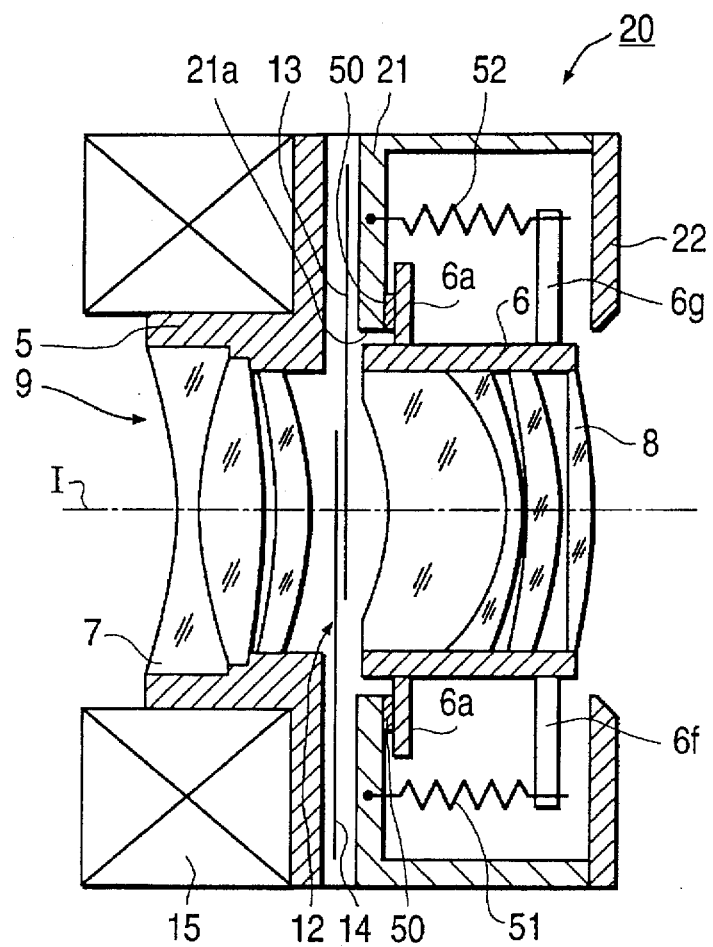
FIG. 4 is a cross-sectional diagram of the vibration compensation device of FIG. 1, taken along the IV—IV line in FIG. 1, in accordance with the first embodiment of the present invention.

As shown in FIGS. 1 and 3, rollers 59, 60, 61 and 62 are attached to the flange 6a of the lens frame 6 so the rollers can freely rotate around roller shafts 63, 64, 65, and 66, respectively. A spring 53 is attached to the lens rim 6 opposite rollers 59 and 60, between the optical base unit and spring attachment section 6b. Similarly, a spring 54 is attached to the lens rim 6 opposite rollers 61 and 62, between the optical base unit and spring attachment section 6c. The springs 53 and 54 are situated in directions which are approximately the same as the x-axis direction and the y-axis direction, respectively, and which are the directions of motion of the respective spring moving members 36 and 37. The moving members 36 and 37 respectively include contact sections 36b, 36c and 37b, 37c which have a roughly L-shaped cross section at the front edges of moving members 36 and 37. The rollers 59 and 60 are in contact with the connect sections 36b and 36c, respectively by the energizing force of spring 53. The rollers 61 and 62 are in contact with the contact sections 37b and 37c, respectively by the energizing force of spring 54. The above-described structure allows the vibration compensation lens 8 to be shifted along the direction of movable member 36 (x-axis direction) by DC motor 30, but free to move in the y-axis direction. In the same manner, the vibration compensation lens 8 may be shifted along the direction of movable member 37 (y-axis direction) by DC motor 30, but free to move in the y-axis direction. The above-described mechanism for driving the vibration compensation lens 8 makes it possible to shift the vibration-compensation optical system in all directions inside the opening 21a of the optical unit base 21. By using springs 53 and 54 to energize the lens rim 6 in directions which are approximately the same as the x-axis direction and the y-axis direction, which correspond to the directions of motion of the moving members 36 and 37, the lens frame 6 and moving members 36 and 37 are always in contact, and thereby the motion of moving members 36 and 37 can be reliably transmitted to the lens frame 6.

Furthermore, through the energizing force of springs 53 and 54, thrust play in shafts 34 and 35, play in the threading section of male screws 34a and 35a, and play in female screws 36a and 37a can be consistently eliminated in the respective energization directions of the springs 53 and 54. Therefore, the driving force of the respective DC motors 30 and 31 can be accurately and reliably transmitted to the vibration compensation lens 8.

The optical unit base 21 is positioned inside lens barrel 82 and is fitted with cam pins 21s which enables the optical unit base 21 to move in a direction parallel with the optical axis I. The vibration compensation drive unit 20 contains the gear trains 32, 33 and is position on the optical unit base 21 in close proximity to the lens rim 6. The gear shafts 21t and 21u extend substantially in the y-axis direction so that they are parallel with the y-axis. The gear shafts 21v and 21w extend substantially in the x-axis direction so that they are parallel with the x-axis. The gear shafts 21t and 21u are attached to the optical base unit 21 in a standing position and are arranged in a row. The gear shaft 21v and 21w are attached to the optical base unit 21 in a standing position and are arranged in a row. The cam pins 21s are attached in a standing position to parts of the optical base unit 21 in a direction perpendicular to the optical axis I. Furthermore, the multiple gear shafts 21t –21w, and cam pins 21s are arranged at angles on the base.

When the gear shafts 21t–21w of the gear trains, 32 and 33, and the cam follower cam pins 21s are extended in the respective directions, the point of intersection is a position in the vicinity of the optical axis of the vibration compensation lens 8. The optical unit base 21 is a resin molded item. Furthermore, the gear shafts 21t–21w of the gear trains 32, 33 and cam pins 21s are molded as a unit with this base 21 so that their respective die extraction directions differ such as those shown by arrows A and B and arrows C, D and E in FIG. 1. The gear shafts 21t, 21u, 21v and 21w, are attached to the optical unit base 21 at different angles than the cam pins 21s. The cam pins 21s are connected to the optical unit base 21 at three locations. The above described structure enables the optical unit base 21 to be incorporated inside the lens barrel 82 so that it can be moved in the optical axis direction and function as a zoom lens.

Cam follower cam pins 21s are arranged at positions which allow the dies of the gear shafts 21t–21w to be removed from the die extraction directions A and B. Thus it is possible to separately remove the forming dies of optical base unit 21 in die extraction directions A, B, C, D and E. Moreover, it is possible to form these cam pins 21s as a unit with the base unit 21.

The gear shafts 21t and 21u are part of the drive system in the x-axis direction and they are removed from the die in the same direction as the shaft receiving section 21c which is the A direction. The gear shafts 21v and 21w are part of the drive system in the y-axis direction and they are removed from the die in the same direction as the shaft receiving section 21e which is the B direction.

The cam follower cam pins 21s are positioned at three places at equal intervals on the circumference of optical base unit 21 and are removed from the die in the directions shown by arrows C, D and E. The cam follower pins are positioned on the optical unit base 21 that they do not interfere with x-axis and y-axis direction drive systems.

There are many advantages associated with the above embodiments of the present invention. First, the die structure is simple. Second, the cam follower pins 21s and gear shafts 21t–21w can be formed as a unit with the optical unit base 21 and costs are reduced. Furthermore, the cam pins 21s do not interfere with the structure of the drive mechanism. As a result, the drive mechanism is easier to assemble. Moreover, because it is superior in the areas of mold workability and ease of assembly, there is an advantage in that cost reductions can be achieved.

Figure 5:
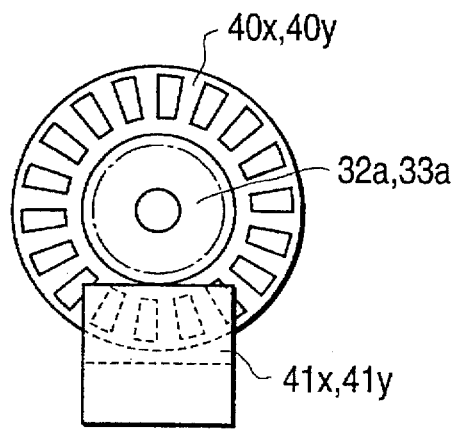
FIG. 5 is a schematic diagram showing a position detecting device for the vibration compensation lens in accordance with the first embodiment of the present invention.

FIG. 5 shows a position and speed detecting device for the vibration compensation optical lens 8 in accordance with the first embodiment of the present invention. The position and speed of the vibration compensation optical lens 8 are determined through the detection of the rotation angles of the motors 30 and 31. As shown in FIGS. 1 and 5, circular plates 4x and 40y, having multiple holes positioned at regular intervals around the perimeter of the circular plates, are positioned so that they move in unison with gears 32a and 33a. Photointerruptors 41x and 41y are attached to the side of the base 21 such that a perimeter section of circular plates 40x and 40y is inserted between respective photointerruptors. The photointerruptors 41x and 41y detect the holes in the sides of circular plates 40x and 40y as pulse signals, and by counting the pulse signal, the detection of the position and the speed of the vibration compensation optical lens 8 is performed.

In accordance with the first embodiment of the invention, the driving force of DC motors 30 and 31 is transmitted to moving members 36 and 37, respectively, through a screw mechanism; however, other mechanisms can be applied which utilize not only screw mechanisms, but which change rotational movement to straight-line movement, for example, mechanisms which employ cam mechanisms and levers. Furthermore, the embodiments of the present invention are not limited to the structure of the vibration compensation lens 8 and that of its drive system shown in the present embodiment. This present invention can be utilized in any system in need of a vibration compensation unit.

Figure 7:
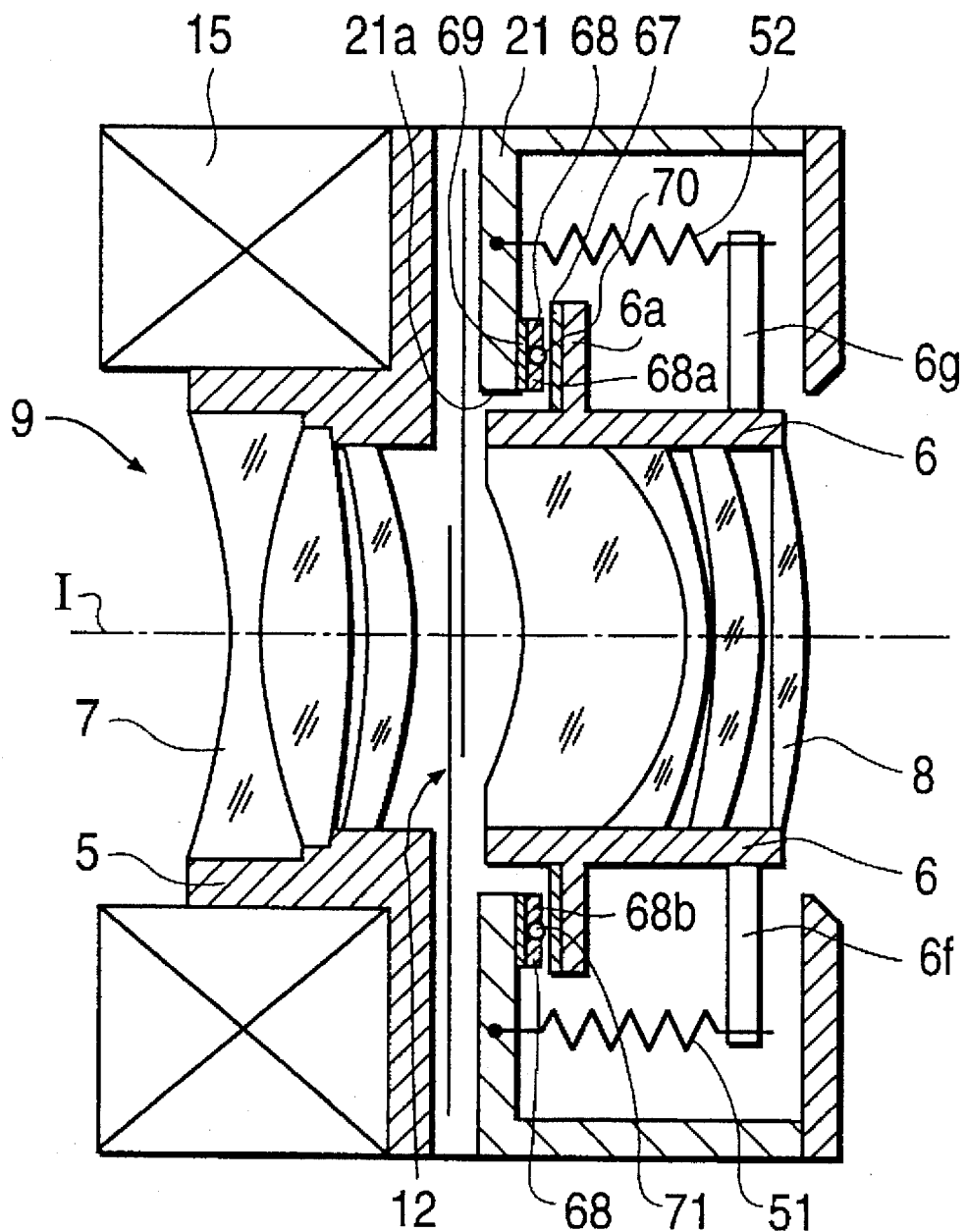
FIG. 7 is a partial cross-sectional diagram of a vibration compensation device for an optical system in accordance with a second embodiment of the present invention.

FIG. 7 shows a vibration compensation device having a guide which guides the vibration compensation optical lens 8 in a plane which is at a right angle with respect to the optical axis I in accordance with a second embodiment of the present invention. The second embodiment of the invention differs from the first embodiment in that instead of sliding member 50, balls 70, 71 are used to guide the vibration compensation optical lens system 8. Like elements in the figures of the first and second embodiments have like reference numerals.

In accordance with the second embodiment, the balls 70, 71 are preferably made of steel. The balls are secured by a structure surrounding the opening 21a of the base 21. The structure for securing the balls 70, 71 includes a first carrier member 67, comprised of a material with high-hardness such as hardened steel, which is secured to flange 6a and is always in contact with balls 70, 71. A second carrier member 69 is positioned on base 21 for carrying balls 70 and 71 and a retainer member 68 is secured to the second carrier member 69 for positioning of balls 70 and 71. The retainer member 68 and the carrier member 69 comprise materials with low-friction characteristics, such as teflon, fluororesins, and a phosphor bronze, or are made of material which has undergone surface treatment to acquire low-friction characteristics.

The balls 70 and 71 pass through holes 68a and 68b on the retainer member 68 so that they can freely rotate. The lens rim 6 is attached to the base 21 by springs 51 and 52 which attach to arms 6f and 6g, respectively, which are part of the lens rim 6. The lens frame 6 is configured in such a way that the first carrier member 67 is always in contact with balls 70 and 71.

Figure 8:
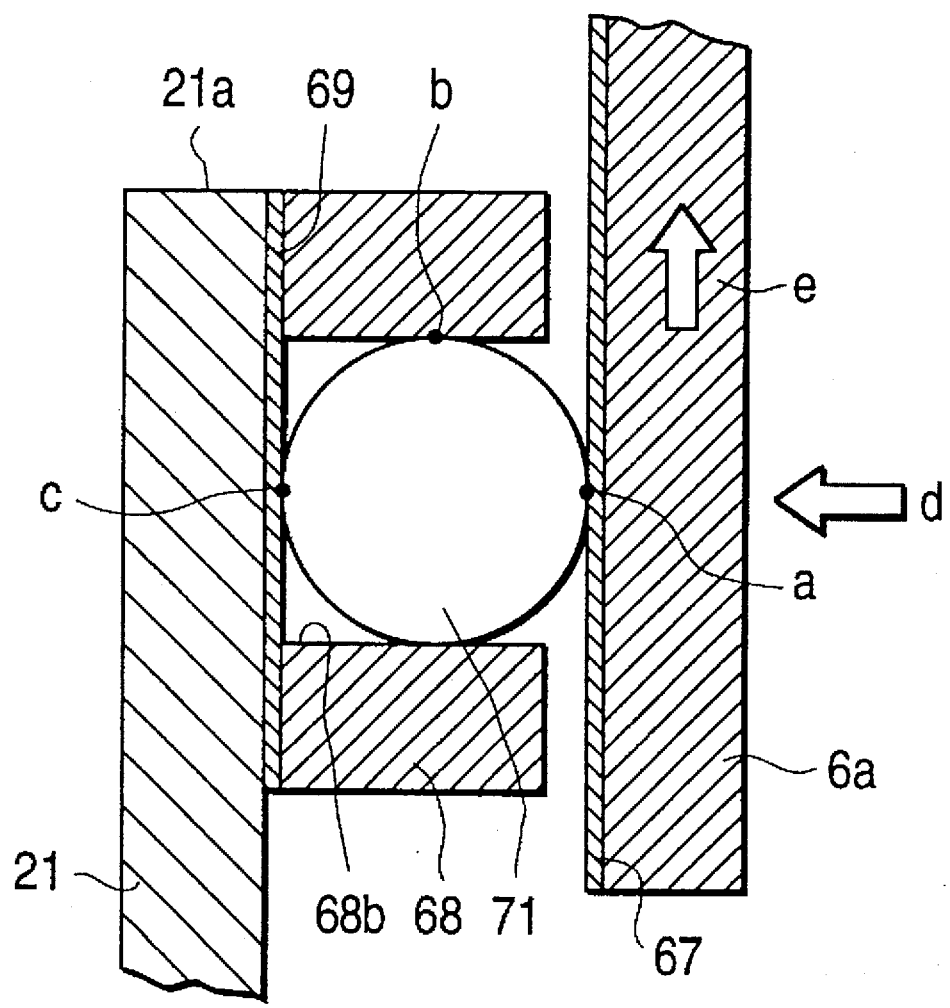
FIG. 8 is an enlarged view of the major parts of a guide mechanism for the vibration compensation device in accordance with the second embodiment of the present invention.

FIG. 8 is an enlargement of the structure shown in FIG. 7, wherein balls 70, 71 are used instead of sliding member 50. The flange 6a of the lens frame 6 is energized in the direction of arrow d by springs 51 and 52, such that ball 71 is always in contact at point a and point c of carrier members 67 and 69, respectively.

When the lens frame 6 is moved in the direction of arrow e, ball 71 is initially in contact with the inner wall of hole 68b of retainer member 68 at point b; however, because friction at the point b and point c contact points is low, ball 71 rotates inside hole 68b of retainer member 68.

In FIG. 7, balls 70 and 71 are shown in only two places, however, multiple balls may be positioned around opening 21a of the base 21. For example, three or four balls may be positioned around opening 21a of base 21. According to the second embodiment, a low load is achieved and reliability and durability are improved by guiding the lens frame 6 using balls 70 and 71.

FIGS. 9 through 14 show a fixed lens barrel 102 containing a lens base 105 for supporting a vibration compensation unit 100 in accordance with a second embodiment of the present invention.

Figure 12:
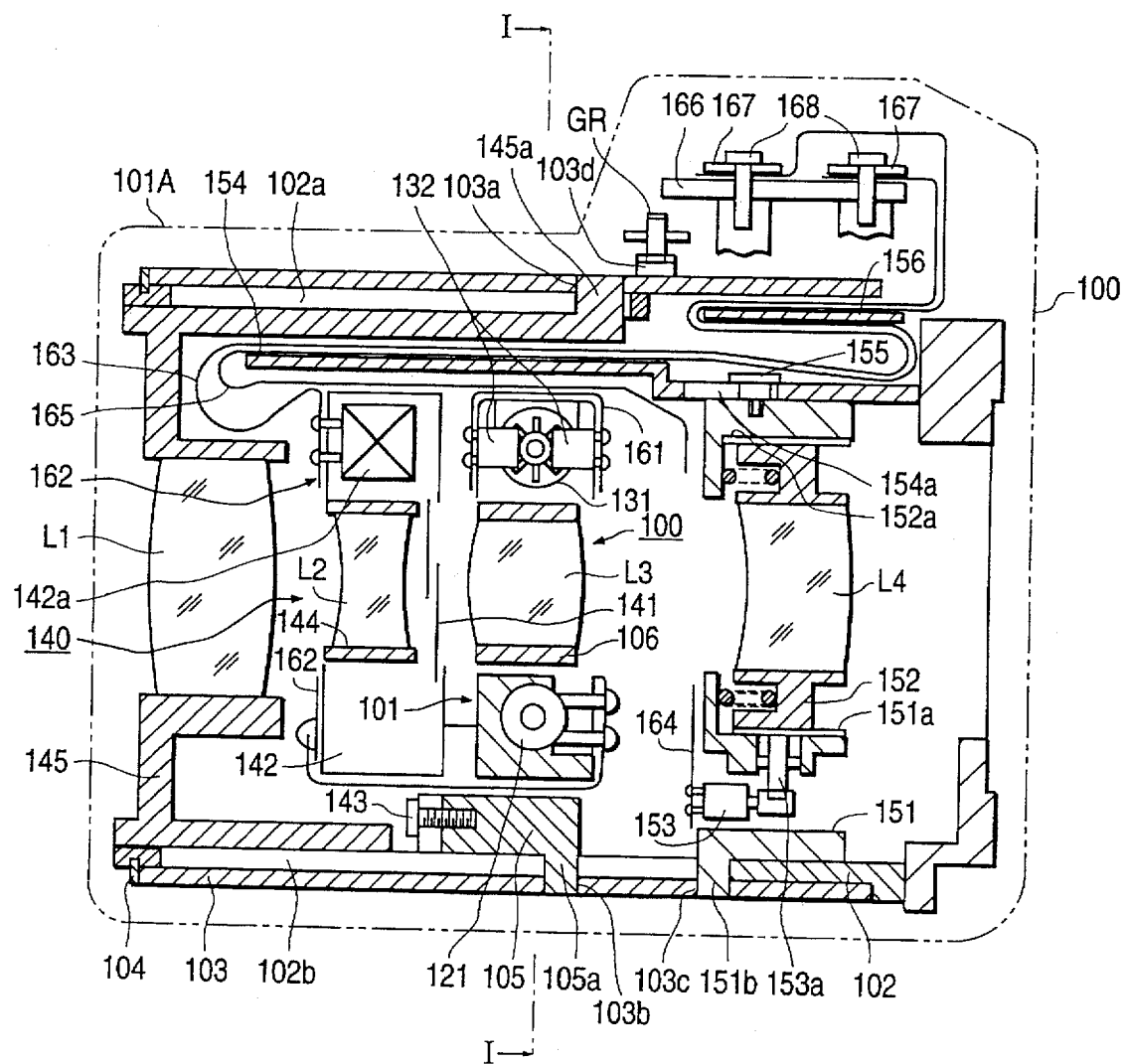
FIG. 12 is a cross-sectional diagram of a camera with the lens barrel in the wide angle position in accordance with a third embodiment of the present invention.
Figure 13:
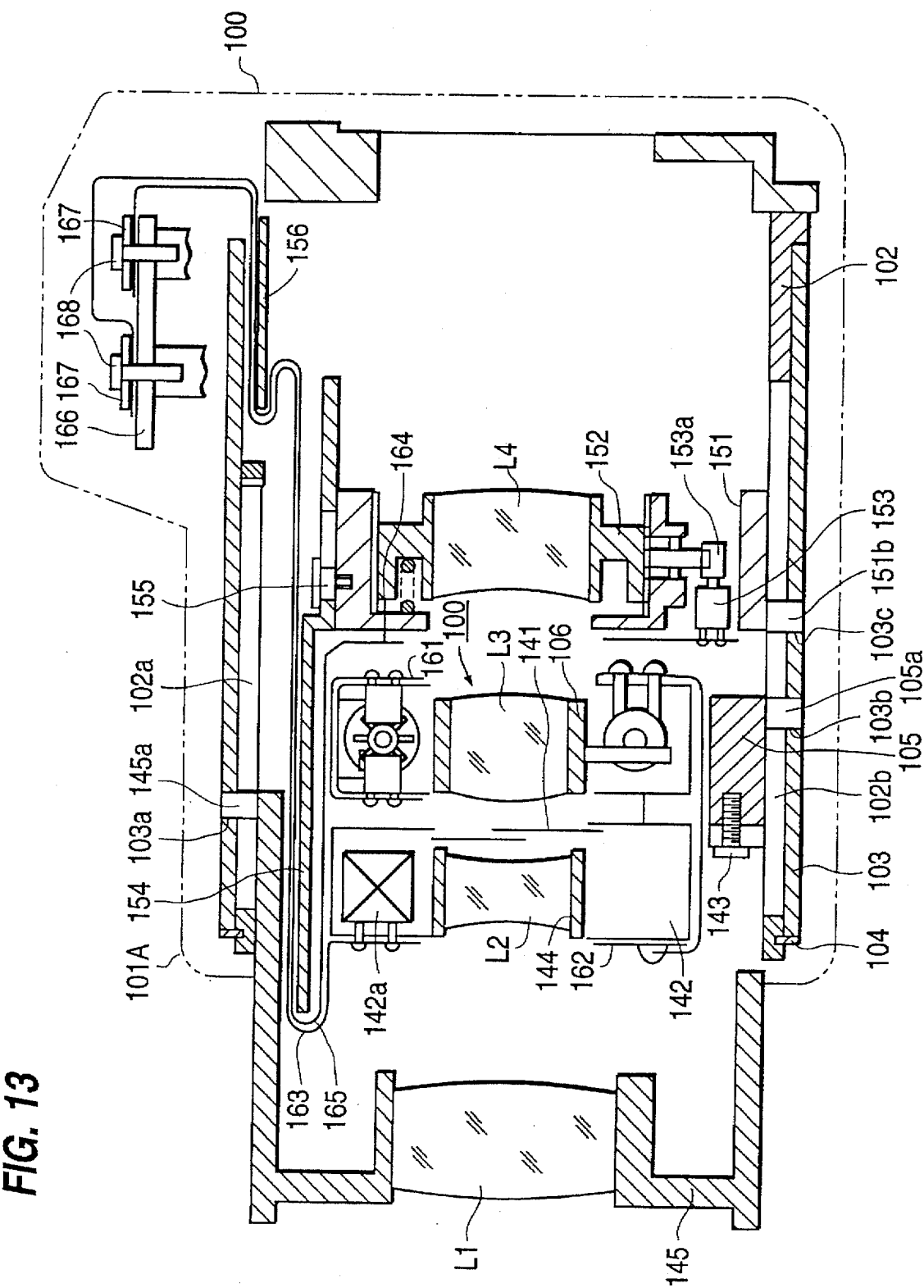
FIG. 13 is a cross-sectional diagram of a camera as shown in FIG. 12 with the lens barrel in the telephoto position.

As shown in FIGS. 12 and 13, the second embodiment shows a zoom lens barrel formed as part of a camera 101.

In particularly, FIG. 12 shows a camera 101 with its lens barrel 102 completely retracted. This position is referred to as the wide angle position. FIG. 13 shows the camera 101 with its lens barrel 102 fully extended. This position is referred to as the telephoto position. A fixed lens barrel 102 is secured to the body of the camera 101. The fixed lens barrel 102 contains straight grooves 102a and 102b that extend in the optical axis direction. A cam cylinder 103 is positioned over the fixed barrel 102 and it is free to rotate around the optical axis. A ring 104 is attached to the end of fixed barrel 102 opposite the camera body to prevent the cam cylinder from sliding off the fixed barrel 102.

A zoom motor not (shown in the diagrams) transmits a driving force to a gear section 103d of cam cylinder 103 via gear GR. The gear GR is positioned on the exterior surface of the cam cylinder 103. The cam cylinder 103 includes spiral cam grooves 103a, 103b and 103c on its exterior surface. The driving force causes the cam cylinder 103 and the spiral cam grooves to rotate.

A lens base 105 is disposed within fix cylinder 103 behind a lens groups L2. The lens base supports a vibration compensation unit 100. The vibration compensation unit 100 includes a vibration compensation lens group L3 (hereinafter referred to as "vibration compensation lens"), a lens rim 106 to hold the vibration compensation lens and a drive mechanism for driving the vibration compensation lens.

Figure 9:
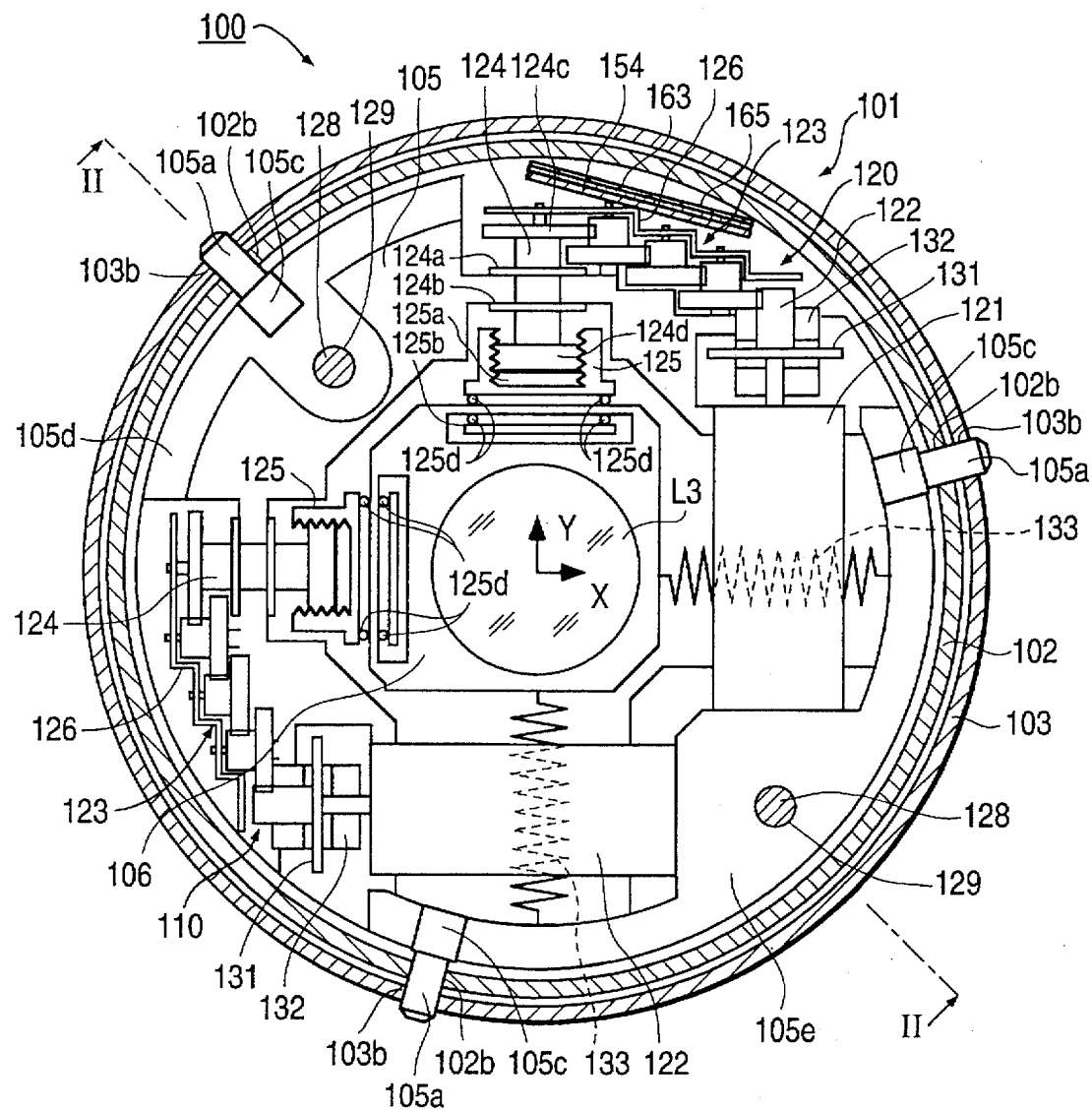
FIG. 9 is a cross-sectional diagram of a vibration compensation device for an optical system in accordance with a third embodiment of the present invention.
Figure 10:
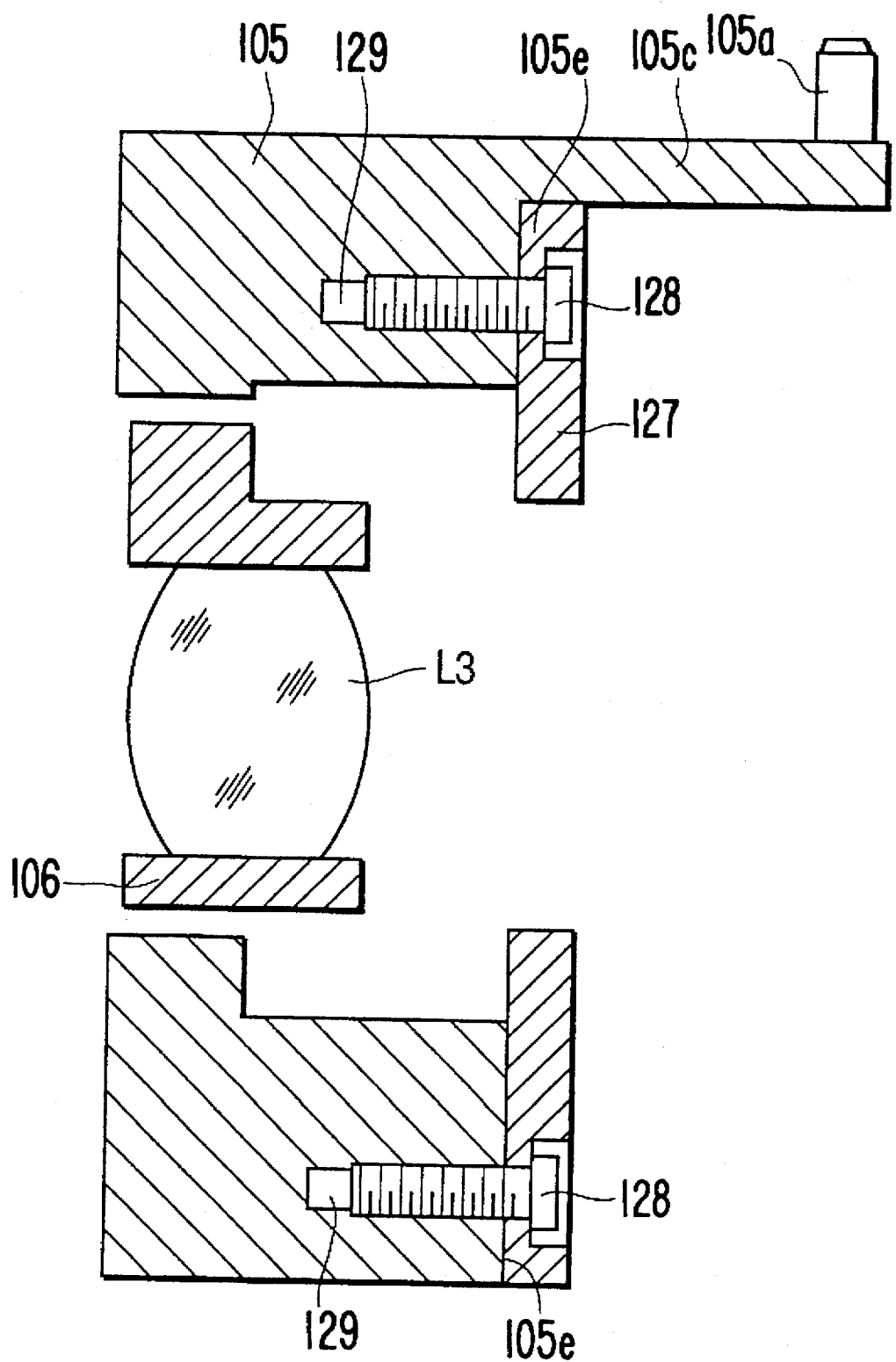
FIG. 10 is a cross-sectional diagram of a vibration compensation device of FIG. 9, taken along the II—II of FIG. 9, in accordance with a third embodiment of the present invention.

Referring now to FIG. 9, the drive mechanism comprises an x-direction drive mechanism 110 which drives the vibration compensation lens L3 in the x-direction, and a y-direction drive mechanism 120 which drives the vibration compensation lens L3 in the y direction. The x-direction and the y-direction are directions which are perpendicular to the optical axis of the photographic lens.

The y-direction drive mechanism 120 comprises a y-direction motor 121, a gear 122, a reduction gear train 123, a drive shaft 124 and a y-direction drive arm 125. The gear 122 rotates in unison with the output shaft of motor 121 and the reduction gear train 123 decelerates the rotation of this gear 122. The y-direction shaft 124 is positioned between the gear train 123 and the y-direction drive arm 125. The y-direction drive arm converts the rotation of the drive shaft 124 into rectilinear motion.

The reduction gear train 123 is arranged in steps and is positioned inboard of the outer edge of the lens base 105. A pressure gear plate 126 is attached to the lens base 105. The pressure gear plate 126 supports the reduction gear train 123.

A pair of flanges 124a and 124b are connected to the lens base 105. The y-direction drive shaft 124 is positioned between the pair of flanges, 124a and 124b so that it is free to rotate. A gear 124c is connected to the upper part of the drive shaft 124 and a male screw 124d is formed on the lower part of drive shaft 124. The gear 124c meshes with the last gear in the reduction gear train 123. The y-direction drive arm 125 includes a female screw section 125a located on the upper part thereof. The drive shaft 124 includes a male screw section 124d formed near one of its ends. The male screw 124d section is received by the female screw section 125a. Furthermore, the y-direction drive arm 125 is positioned on a part of the lens base 105 in which it is free to ascend and descend.

A gripping arm 125b is formed at the lower end of the drive arm 125 and is connected to the lens rim 106. Four slider balls 125d are positioned between the gripping arm 125b and the lens rim 106. The above-described structure enables the vibration compensation lens L3 to be shifted in the y-axis direction. The distance that the vibration compensation lens L3 is shifted is directly proportional to the number of revolutions of the motor 121.

Figure 11:
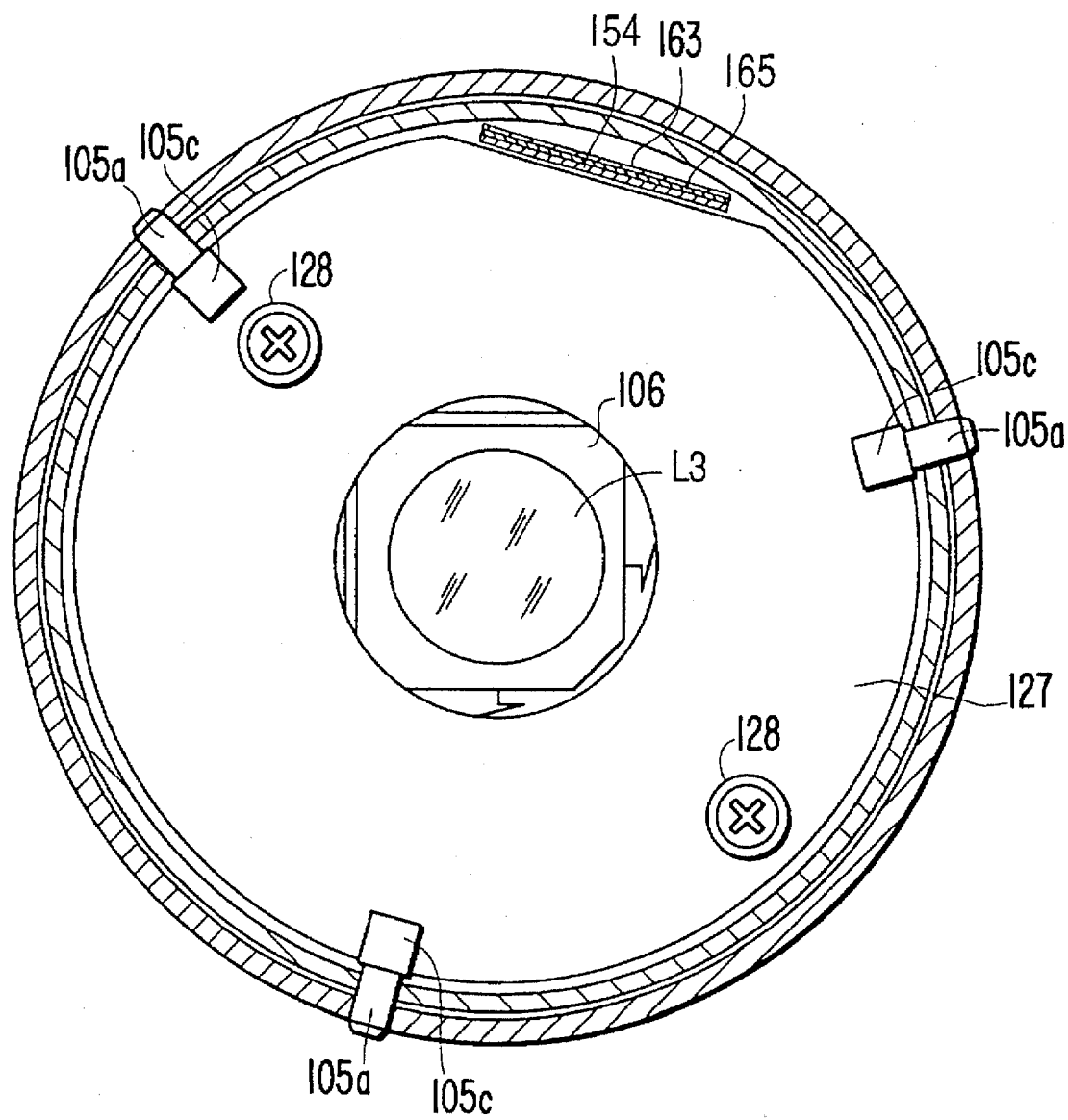
FIG. 11 is a cross-sectional diagram from the rear side of the lens barrel in accordance with a preferred embodiment of the invention.

As shown in FIGS. 9 and 11, a cover plate 127 is attached to the lens base 105. The cover plate 127 covers the space in the lens base containing the drive mechanism of the vibration compensation unit 100. The cover plate is secured to clamp faces 105d and 105e of lens base 105 and is secured by means of screws 128 being screwed into screw holes 129.

An x-direction drive mechanism 110 for shifting the vibration compensation lens L3 in the x-axis direction is structured in the same manner as the y-direction mechanism. Thus a detailed explanation of that structure has been omitted.

Also, a disc 131 in which multiple holes are formed concentrically is attached to gear 122, which rotates in unison with the output shaft of the y-direction motor 121, so that it is able to rotate in unison with that gear.

The output shaft of y-direction motor 121 rotates in unison with gear 122. The gear 122 is attached to a disc 131. The disc 131 rotates in unison with gear 122 and contains multiple holes positioned concentrically near it outer periphery.

The motor is controlled by a photointerrupter 132 that is positioned on the lens base so that it fits around the section of the disc 131 in which the multiple holes are formed. The common photointerrupter contains opposing photoemitter and photoreceptor sections. The common photointerrupter produces a pulse signal each time the opposing photoemitter and photoreceptor sections detect a hole in the disc 131. The number of pulses produced by the photointerrupter is indicative of the number of rotation made the disc 131 and the gear 122. After the motor 120 has generated the proper number of revolutions to adjust the vibration compensation lens L3, the photointerrupter directs the motor to stop. The same type of disc 131 and photointerrupter 132 are attached to the x-direction motor 122.

In FIG. 9, one photointerrupter 132 is shown for the x direction drive system and one photointerrupter is shown for the y direction drive system. In actuality, there are two photointerrupters 132 attached for each direction. The second sets of photointerrupters are used to detect the movement of the vibration compensation lens L3.

Springs 133 impart energy onto the lens rims 106. One spring 133 biases the vibration compensation lens L3 in the y-direction. The other spring 133 biases the vibration compensation lens L3 in the x-direction.

As shown in FIGS. 9 and 11, the lens base 105 includes three pin arms 105c that are spaced apart from each other at three equal intervals. A cam follower pin 105a is formed at the end of each pin arm 105c. The cam follower pins 105a extend through cam grooves 103b of cam cylinder 103 and fit into the straight grooves 102b of fixed lens barrel 102. The pin arms 105c extend away from the lens base 105 in the optical axis direction.

As shown in FIGS. 12 and 13 a lens shutter mechanism 140 is positioned in front of the vibration compensation device 100. The shutter mechanism 140 includes a blade 141 and a driver 142. The driver 142 controls the shutter blade 141. The driver 142 is attached to lens base 105 by a machine screw 143. Electrical components 42a are attached to the motor for driving the shutter blade 141.

A lens holder 145 which holds the lens group L1 is positioned at the front end of the fixed lens barrel 102. Cam pins 145a are formed on the exterior surface of the lens holder 145. The cam pins 45a extend through straight grooves 102a and fit into cam grooves 103a.

A lens base 151 includes helicoid grooves 151a formed on its interior surface. The lens base 151 carries the lens group L4 and is inserted through the rear side of fixed lens barrel 102. Cam pins 151b are formed on the exterior surface of lens base 151. The cam pin 151b are arranged so that they extend through straight grooves 102b and fit into cam grooves 103c.

A lens holder 152 supports the focusing lens group L4. Helicoid grooves 152a are formed on the exterior surface lens holder 152. The helicoid grooves 152 mesh with the helicoid grooves 151 on the interior surface of lens base 151. A gear 153a is positioned between the output shaft of a focusing motor 153 and the helicoid grooves 152a. Thus, the driving force of focusing motor 153 can be transmitted to the helicoid grooves 151a via gear 153a. As a result, the lens holder 152 is caused to rotate and move in the optical axis direction. Focusing is performed in this way.

A guide plate 154 (also referred to as a "FPC board support plate") is connected to the lens base 151 and extends forward in the optical axis direction. The lens base 151 carries the lens group L4. The guide plate 154 supports the flexible printed circuit boards 163, 165 (hereinafter called "FPC boards"). The FPC boards 163, 165 connect the various electrical components contained within the lens barrel with a control circuit 166 positioned on top of camera 101. The guide plate 154 is positioned on the lens base 151 near the top of the fixed barrel 102 so that it is as close as it can be to the control circuit 166. As shown in FIG. 9, the guide plate 154 is positioned so that it is directly above the gear pressure plate 126 of the gear reduction train 123. The FPC boards 163, 165 are stacked on top of the guide member 154. By arranging the guide plate 154 in this manner, the size of the lens barrel 1A is greatly reduced.

The guide plate 154 contains a slot 154a. A stepped machine screw 155 which extends through slot 154 and into the lens base 151. When the lens base 151 is advanced forward in the optical axis direction, the stepped machine screw 155 is carried forward and contacts the guide plate 154. Thereafter, the guide plate and the lens plate move in unison.

Another FPC guide plate 156 is positioned on the inner surface the of the cam cylinder 103. This FPC guide plate is positioned near the rear of the cam cylinder 103.

A circular shaped vibration compensation flexible printed circuit board 161 (hereinafter referred to as the "vibration compensation FPC board") is attached to all the electrical components of the vibration compensation device 100. Specifically, the vibration compensation FPC board 161 in connected to the motors 121 and the photointerrupters 132. A lower section of the vibration compensation FPC board 161 extends through a hole which is in the lens base 105 and is attached to a mount board 162 attached to the shutter mechanism.

Electrical components 142a inside the shutter driver 142 are connected to the mount board 162. Furthermore, the flexible FPC board 163 is connected to the mount board 162.

A circular mount board 164 is supported by the lens base 151. The focusing motor 153 is connected to the circular mount board 164. FPC board 165 is connected to the circular mount board 164, thereby establishing a link between the focusing motor 153 and a control circuit outside the fixed lens barrel 102.

Figure 14:
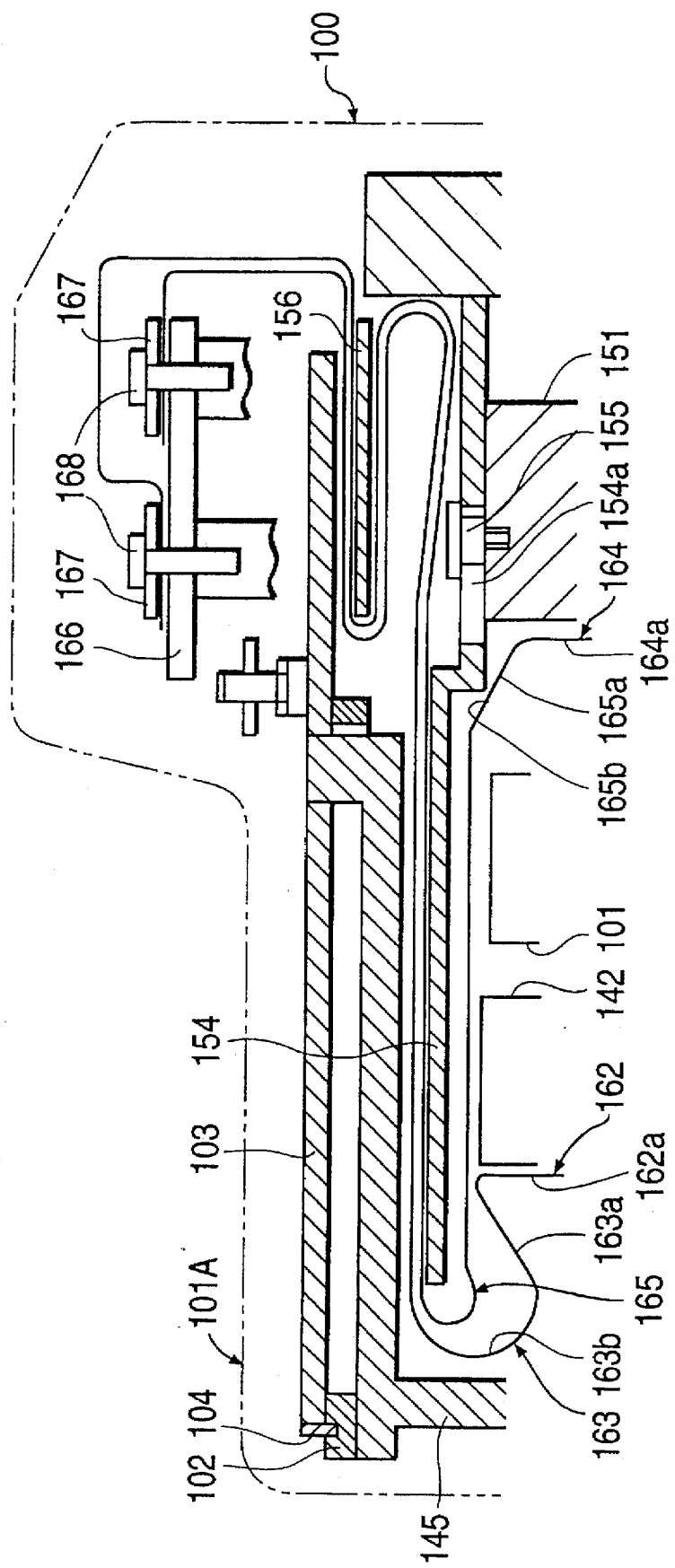
FIG. 14 is a cross-sectional diagram of the lens barrel showing an enlargement of the FPC board wiring section.

As shown in FIG. 14, the FPC board 165, 163 are stacked on top of each other. The FPC boards 165, 163 are bent around a FPC guide plate 156 and extend forward in the direction of the optical axis. The FPC boards 165, 163 are then bent around a FPC support plate 154 and extend towards the back of the camera 101 (hereinafter also referred to as "camera body 101").

The FPC boards 165, 163 each have a conduction pattern formed on respective surfaces of the FPC boards 163, 165. As shown in FIGS. 12 through 14, the FPC boards 163 and 165 are connected to the respective mount boards 162 and 164 so that the surfaces 163a and 165a on which these conduction patterns are formed are in contact surfaces 162a and 164a of the respective mounted boards, 162 and 164.

The FPC boards 163 and 165 are stacked so that a cover surface 165a of FPC board 165 and the back surface 163b (the surface on which the conduction pattern is not formed, hereinafter referred to as the "base surface") of FPC board 163 are in contact with each other.

After FPC boards 163 and 165 have been folded toward the rear of the body of camera 101 and pulled around toward the rear of the camera through the space between the FPC guide plate 154 and the lens base 145, they are folded toward the front of the body of camera 101 and pulled outside the lens barrel through the space between the FPC guide plate member 156 and the cam cylinder 103. Their front ends are guided toward the upper part of the body of the camera 101, and connected to the control circuit 166. The control circuit comprises a control IC. The front ends of the FPC boards 163 and 165, are connected to the control circuit 166 by presser plates 167 and machine screws 168.

In the above-described structure, when zooming operation commences the cam cylinder 103 is rotated by means of gear GR. The respective cam grooves, 103a, 103b and 103c move in conjunction with the rotation of cam cylinder 103. The lens holder 145 and lens base 105 and 151 are respectively driven in the optical axis direction by means of cam pins 145a, 105a and 153a. As a result, the respective lens groups L1-L4 are driven between the wide position and the tele positions.

The respective FPC boards 163 and 165 do not place an unmanageable load on lens groups L1-L4.

The above-described structure supports a zoom photographic lens which is equipped with a vibration compensation lens L3. The FPC board 163 is positioned inside the lens barrel so that it does not interfere with the lens group L3 drive mechanisms 142, 110, 120 and 153. The size of the lens barrel is reduced because the above described structure provides for more efficient use of the limited space within the lens barrel.

In this particular embodiment, the lens barrel contains a lens base 105. The lens base 105 supports all the parts of the vibration compensation unit. Furthermore, the various parts of the vibration compensation unit are positioned on the lens base 105 so that the space inside the lens barrel is effectively utilized. For example, the y-direction drive mechanism 120 is positioned on the lens base 103 so that it is close to the upper part of the body of the camera 101. Furthermore, the cam pin 105a is positioned on the lens base 105 so that it does not interfere with the operation with the reduction gear trains 123. In addition, the reduction gear trains are positioned on the lens base so that they are close to the upper part of the camera body.

Although this second embodiment of the present invention has been described with respect to a particular configuration for the vibration compensation unit, it will be recognized that the present embodiment is not limited to the particular configuration and modifications and changes are possible. For example, while link between the control circuit 166 and the electrical devices of the vibration compensation lens group L3 involved the stacking of two FPC boards 163 and 165, it will be recognized that three or more FPC boards could be used to unite the control circuit to various electrical devices within the lens barrel. Furthermore, the electrical components inside the lens barrel are not limited to those of the present embodiment. For example, an encoder which detects the focal length of the zoom lens or an encoder which detects the position of the focusing lens could be used in conjunction with this embodiment. Moreover, the electrical components inside the lens barrel were connected to mount boards 162 and 164 as were the ends of the respective FPC boards 163 and 165. It will be recognized that FPC boards could be substituted for the mount boards. The present invention may also be applied to interchangeable lenses which are inserted into single-lens reflex cameras. In this case, the configuration used is such that the front ends of the multiple stacked FPC boards are connected to a contact inside the interchangeable lens barrel and the electrical components inside the lens barrel are all connected to that contact.

FIGS. 15 through 20 show a lens barrel in accordance with a third embodiment of the present invention containing a support body 220 for supporting a vibration compensation drive unit 212.

Figure 15:
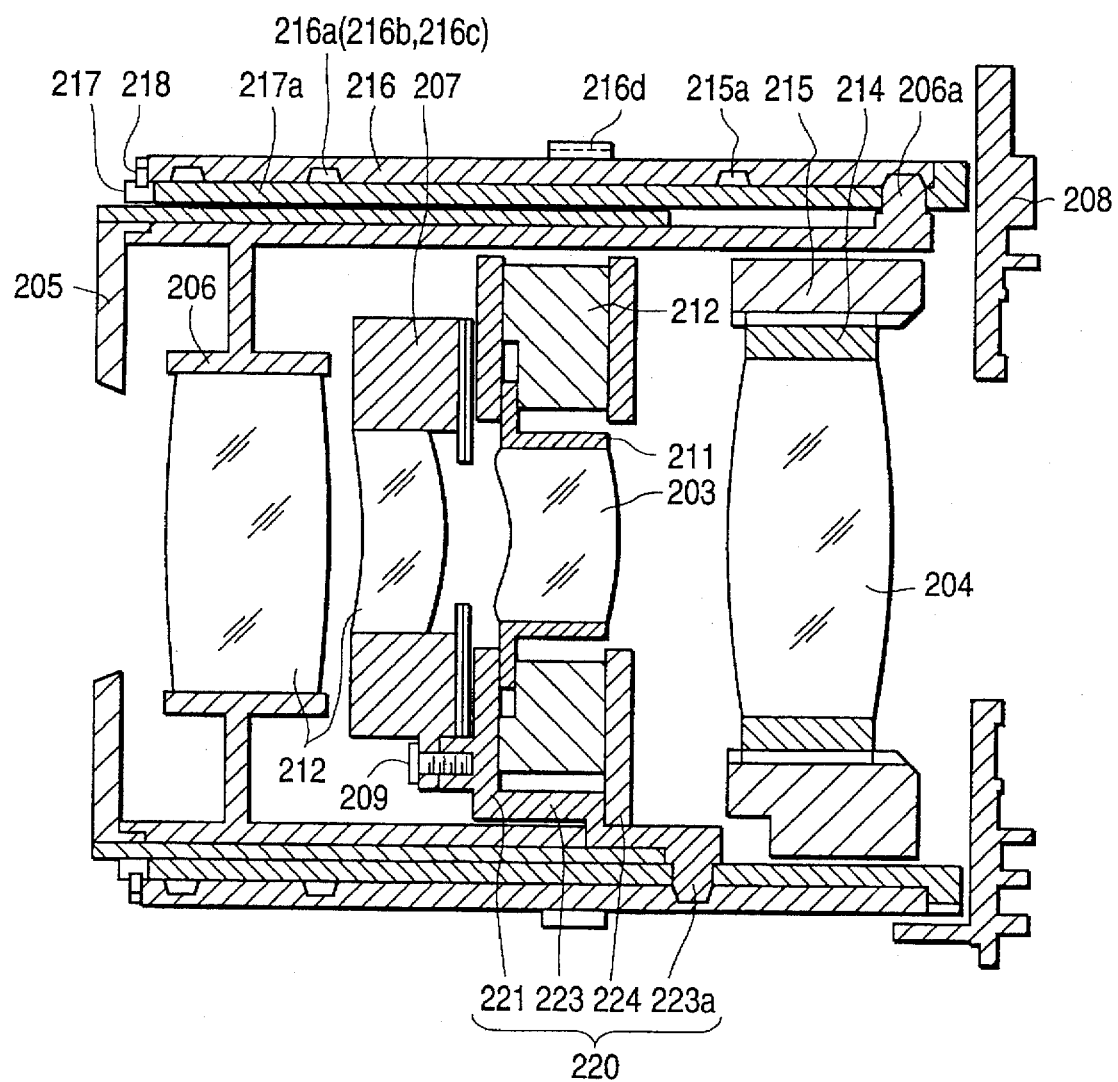
FIG. 15 is a cross-sectional diagram of the section into which the image blur compensation device is incorporated in accordance with a third embodiment of the present invention.
Figure 16:
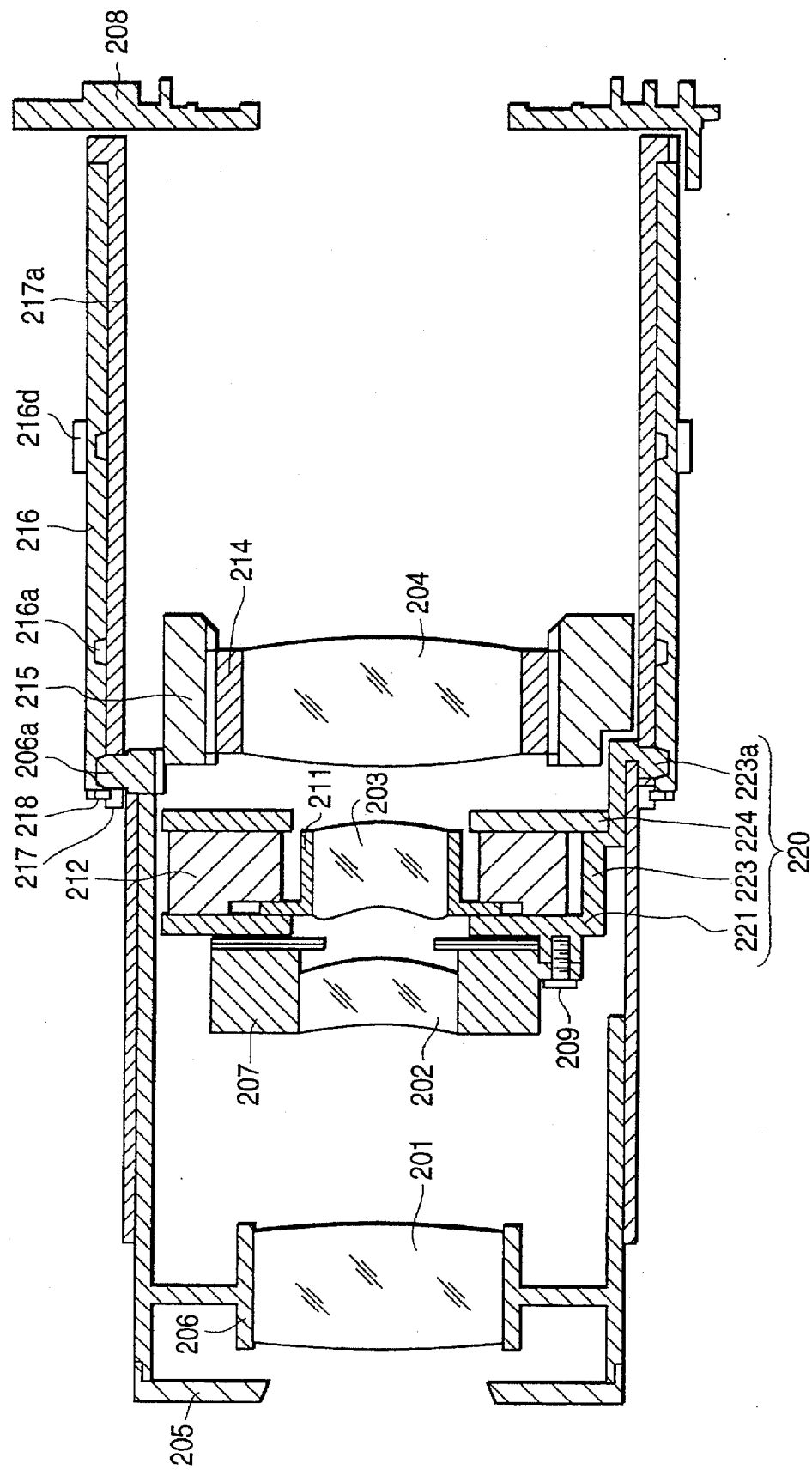
FIG. 16 is a cross-sectional diagram of the lens barrel in accordance with a fourth embodiment of the present invention.

FIG. 15 is a cross-sectional diagram of the lens barrel shown in its collapsed position and FIG. 16 is a cross-sectional diagram of the lens barrel shown in its telescopic position. The lens barrel includes a photographic optical system comprising a first lens group 201, a second lens group 200, and a third lens group 204. The first lens group 201 is supported by a cylinder 206. The cylinder 206 includes follower pins 206a formed on the exterior surface of cylinder 206. The second lens group 200 comprises two lens groups: front lens group 202 and rear lens group 203. The front lens group 202 is supported by a shutter unit 207. The rear lens group 203 is supported by a lens rim 211. The rear lens group 203 also serves as the a vibration compensation lens. The support body 220 supports the rear lens group 203 and the vibration compensation drive unit 212. The support body 220 comprises a vibration compensation base 221, arms 223 and a pressure plate 224. A shutter unit 207 is connected to the vibration compensation base 221 by a screw 209. The vibration compensation base 221 supports the lens rim 211. The lens rim 211 is biased by an energy imparting means (not shown in the diagram) in a direction which is approximately perpendicular to the optical axis direction. The vibration compensation drive unit 212 is pressed against the vibration compensation base 221 by a pressure plate 224. The vibration compensation drive unit 212 is connected to lens rim 211. In order to compensate for vibrations affecting the camera, the vibration compensation drive unit 212 adjusts the rear lens 203 in a direction which is approximately perpendicular to the optical axis. As a result of the adjustment image blur is greatly reduced. The arms 223 extend out from the periphery of the vibration compensation base in a direction parallel to the optical axis. Furthermore, the arms 223 extend from the outer periphery of the vibration compensation base 221 to points beyond the pressure plate 224. The arms 223a are formed in this manner to reduce the size of the lens barrel and to ensure that there is sufficient stroke of the rear lens group 203 of the second lens group 200 in the optical axis direction. Follower pins 223a are connected to the outer surfaces of the arms 223.

The third lens group 204 is held by lens rim 214. A focus unit 215 is attached to the lens rim 214. Furthermore, focus unit 215 includes follower pins positioned on it exterior surface enabling it to move in the optical axis direction.

Figure 17:
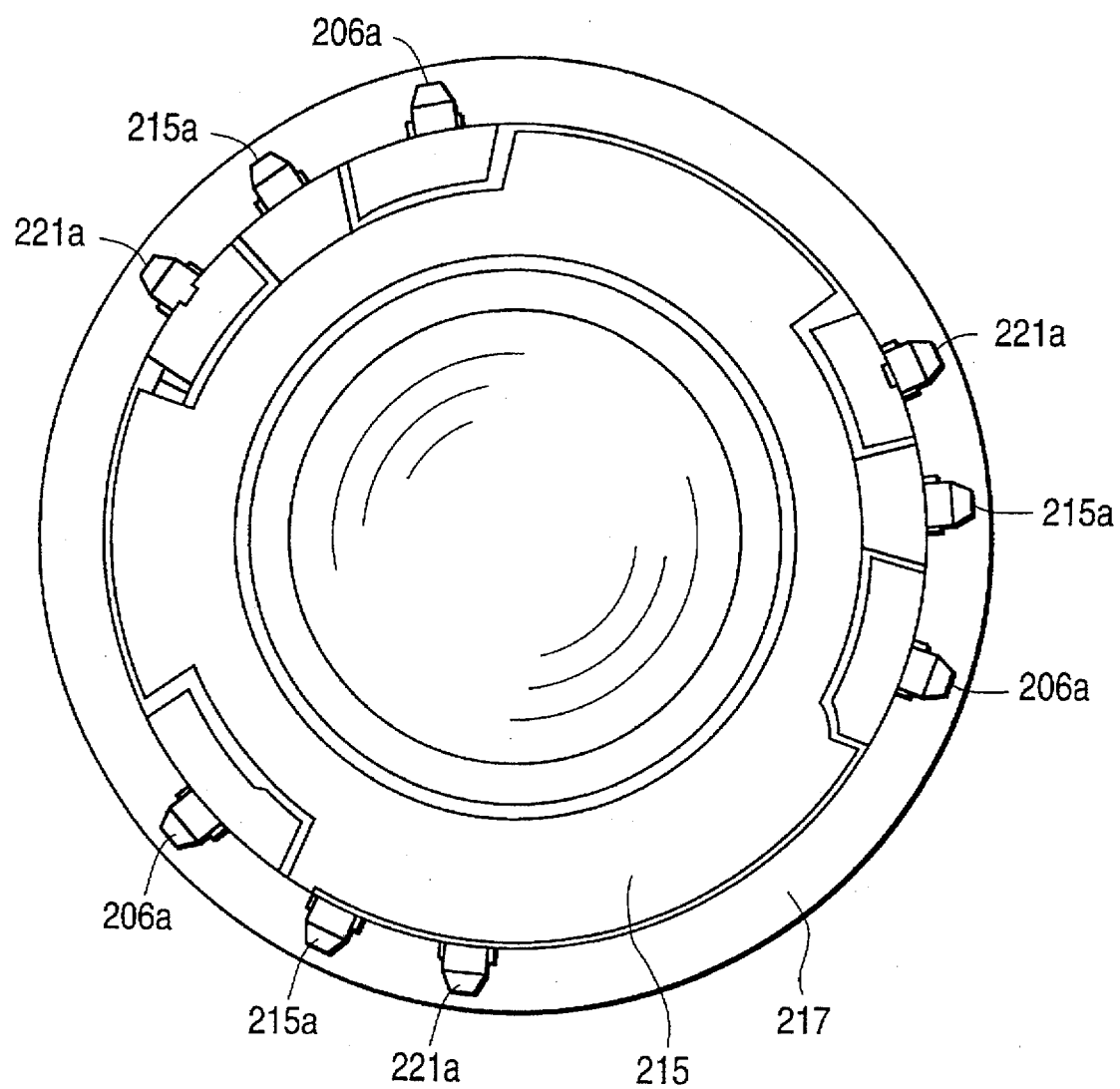
FIG. 17 is a view of the rear side of the lens barrel as shown in FIG. 15.

The lens barrel 217 is secured to a camera body 208. The lens barrel 217 includes a forward advance guide hole 217a which extends in the optical axis direction. A cam cylinder 216 is positioned over the lens barrel 217 and rotates around the optical axis. The lens barrel 217 includes a ring 218 located at the end opposite the camera body 208 that prevents the cam cylinder 216 from slipping off the lens barrel 217. The cam cylinder 216 includes cam grooves 216a, 216b and 216c that correspond with the respective lens groups 201, 200 and 204. The cam grooves 216a, 216b and 216c all have fixed forward movement angles. The follower pins, 206a, 215a and 223a extend through the forward advance guide hole 217a and into the cam grooves 216a, 216b and 216c. Here, the rear surface of the lens barrel of FIG. 15 is shown in FIG. 17. The respective follower pins 206a, 215a and 223a are arranged as shown in FIG. 17 to ensure the stroke amount determined by the optical characteristics of the respective lens groups and to achieve greater compactness of the lens barrel.

Gear 216d is attached to the outer circumference of the cam ring 216 and is connected to a gear drive system (not shown in the FIGS.).

In operation, a driving force applied to gear 216d will causes cam cylinder 216 to rotate around the optical axis. Accordingly, cam grooves 216a, 216b and 216c will rotate. The follower pins 206a, 215a and 223a that extend into cam grooves 216a, 216b and 216c are prevented from rotating by the forward advance guide hole 217. As a result, the follower pins 206a, 215a and 223a are forced to move in the optical axis direction along forward advance guide hole 217a. Furthermore, the respective lens groups 201,200 and 204 are moved in the optical axis direction.

Figure 18:
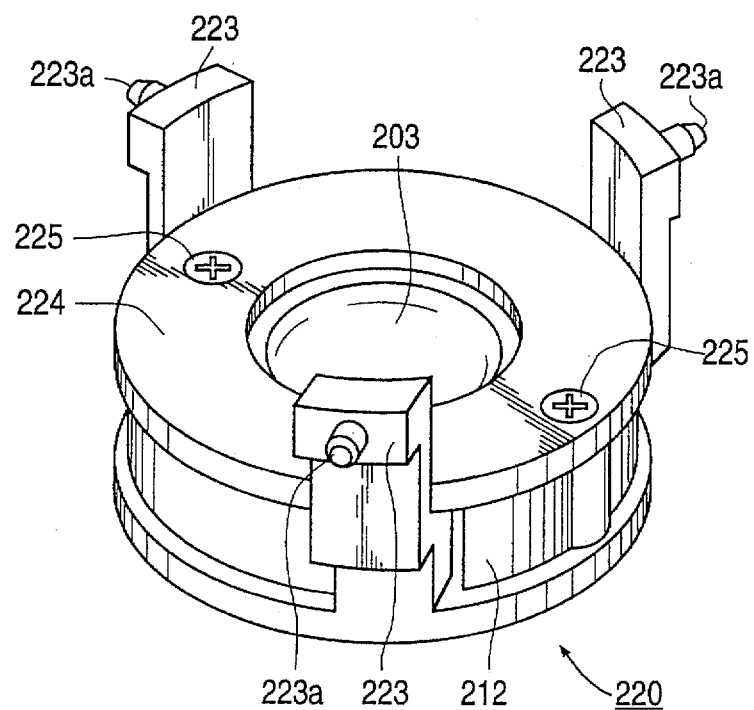
FIG. 18 is a perspective view of a support body as shown in FIG. 15.

As shown in FIG. 18, the pressure plate 224 is secured to the vibration compensation base 221 by screws 225. The arms 223 extend from the periphery of vibration compensation base 221 to points beyond the exterior surface of the presser plate 224. The arms 223 can be easily bent if the vibration compensation base 221 is supporting a heavy load. If the arms 223 flex then the rear lens group 203 will tilt causing the optical characteristics of the optical system to deteriorate. In order to prevent the arms 223 from flexing, the outer surface of the, pressure plate 224 supports the interior surfaces (the surfaces facing the optical axis) of the arms 223. Hence, the arms 223 become more ridged.

Figure 19:
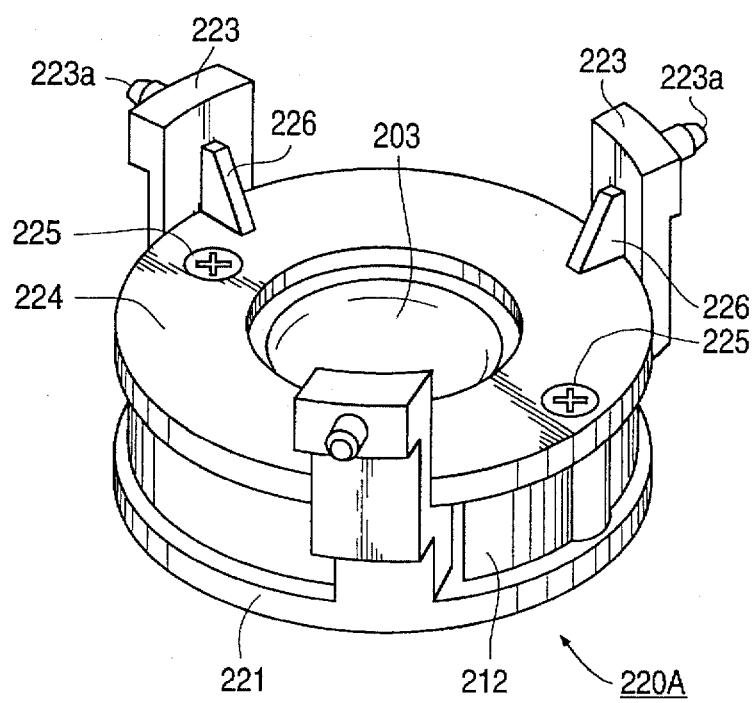
FIG. 19 is a perspective view of a support body in accordance with a fifth embodiment of the present invention.

FIG. 19 is a perspective view of a support body 220A which is an alternative embodiment of the present invention. Reinforcing pieces 226 are secured between the pressure plate 224 and the interior surface of arms 223. If this is done, it is possible to have the arms 223 and the reinforcing pieces 226 come into contact, and it also possible to have them face each other with an appropriate gap between them. As a result, the arms 223 become even less likely to bend. Also, even if the reinforcing pieces 226 are attached in this way, and even if focus unit 215 and support body 220A come near each other in a telescopic mode (FIG. 2), the reinforcing pieces 226 and the focus unit 215 will not meet.

Also, the reinforcing pieces 226 may be attached to the side with the arms 223. If this is done, when the pressure plate 224 is attached from the upper side as shown in FIG. 17, the reinforcing pieces 226 can be formed to a size which is within the range where the arms 223 can be bent toward the outside, and when the pressure plate 224 and the vibration compensation base 221 are fit together, the arrangement may be such that the pressure plate 24 is pressed against the vibration compensation base 221 side by the reinforcing pieces 226. If this is done, there is no need to use the screws 225. Also, it is permissible to have an arrangement in which the pressure plate 224 and part of another member are fit together as the rotation stop of pressure plate 224.

Figure 20:
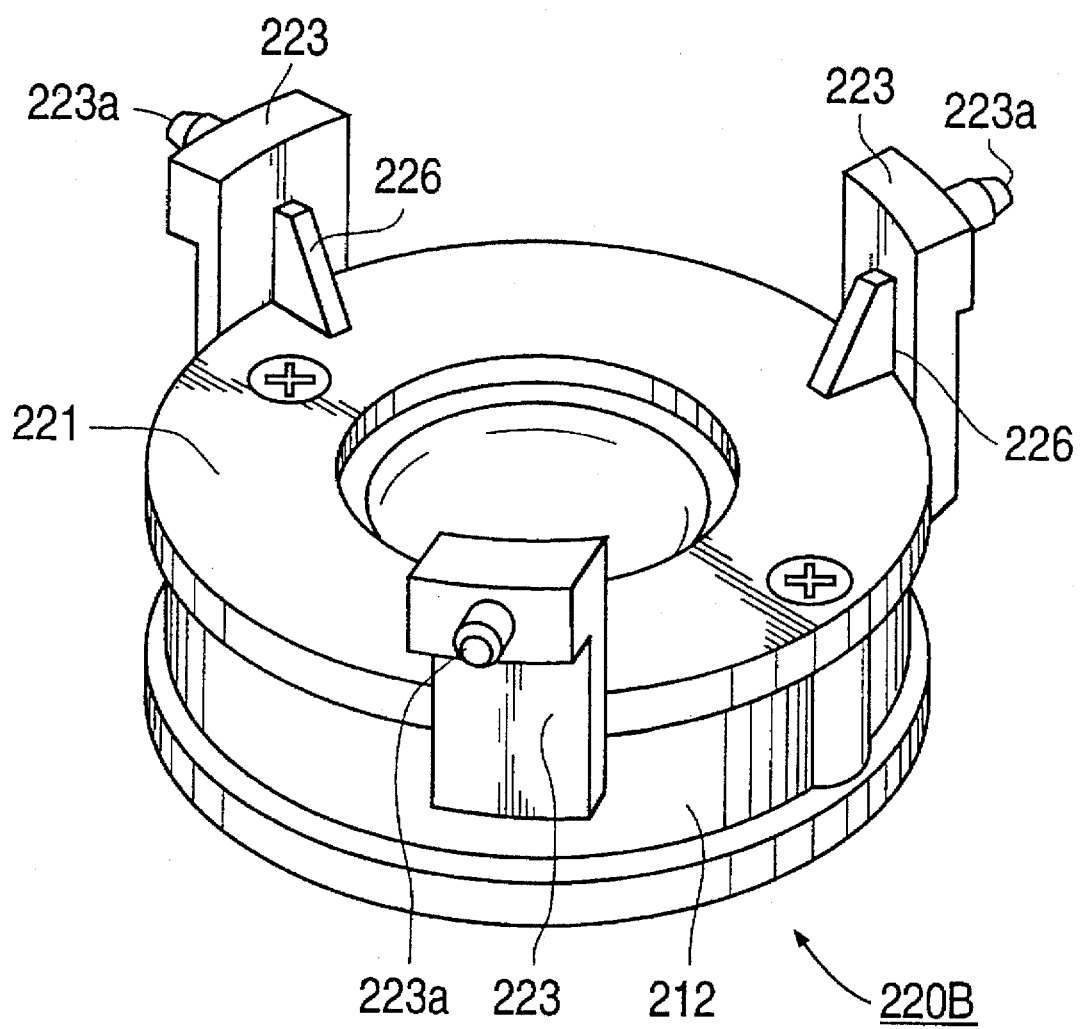
FIG. 20 is a perspective view of a support body in accordance with a sixth embodiment of the present invention.

FIG. 20 is a perspective view of a support body 220B, which is yet a further alternative embodiment for the lens barrel in accordance with the present invention. The arms 223 extend to the side opposite the side with the vibration compensation drive unit 212. Therefore, the effective length of the arms 223 is short in comparison to the length of the arms 223 of support bodies 220 and 220A, and they can therefore be made less likely to bend. Also, when these are used, the pressure plate 224 does not need to be attached. Moreover, as shown in FIG. 20, if the reinforcing pieces 226, which connect the vibration compensation base 221 and the inner surfaces of the arms 223 are attached, the arms 223 can be made more rigid.

Although preferred embodiments of the present invention have been described above, the present invention is not limited to the above-mentioned embodiments, and various modifications are possible.

For example, support body 220 supported the vibration compensation drive unit 212 and the rear lens group 203, which was the vibration compensation lens, but it is not limited to this, and it may be applied so that it supports other structural units of the lens barrel, such as the focus unit 215, the shutter unit 207, and the aperture unit.

The lens groups for this optical system in accordance with the present invention may be used as zoom lenses or focusing lenses.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lens barrel comprising:

an optical system having an optical axis;

a carrier holding the optical system;

a vibration compensation drive unit to move the carrier perpendicular to the optical axis so as to compensate for vibrations;

a base for supporting the vibration compensation drive unit and the carrier;

a fixed cylinder for housing the base and the optical system;

a cam cylinder positioned over the fixed cylinder and adapted to rotate around the optical axis;

a plurality of arms connected to an outer periphery of the base and extending in the optical axis direction past the vibration compensation drive unit and the carrier along an interior surface of the fixed cylinder;

follower pins connected to the plurality of arms, the follower pins extending through grooves in the fixed cylinder and into grooves in the cam cylinder, and a plate seated on ledges on each of the multiple arms, said plate pressing the vibration compensation drive unit against the base and provided with an opening over the optical system.

2. A lens barrel as claimed in claim 1 further comprising a reinforcing piece positioned between an interior surface of each of the multiple arms and the plate.

3. A lens barrel comprising:

an optical system having an optical axis;

a carrier holding the optical system;

a vibration compensation drive unit to move the carrier perpendicular to the optical axis so as to compensate for vibrations;

a base for supporting the vibrator compensation drive unit and the carrier a fixed cylinder for housing the base and the optical system;

a cam cylinder positioned over the fixed cylinder and adapted to rotate around the optical axis;

a plurality of arms connected to an outer periphery of the base and extending along the optical axis away from a side of the base supporting the optical system;

follower pins positioned on respective multiple arms, the follower pins extending through grooves in the fixed cylinder and into grooves in the cam cylinder; and a plate pressing the vibrator compensation drive unit against the base.

4. A lens barrel according to claim 3, further comprising reinforcing pieces positioned between an interior surface of each of the multiple arms and an exterior surface of the carrier.

* * * * *